United States Patent
Ibuki

(10) Patent No.: US 9,712,428 B2
(45) Date of Patent: Jul. 18, 2017

(54) WIRELESS TERMINAL DEVICE, METHOD FOR GENERATING NUMBER OF ALTERNATIVE PATHS, AND WIRELESS COMMUNICATION SYSTEM

(71) Applicant: FUJITSU LIMITED, Kawasaki-shi, Kanagawa (JP)

(72) Inventor: Jun Ibuki, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 52 days.

(21) Appl. No.: 14/860,804

(22) Filed: Sep. 22, 2015

(65) Prior Publication Data

US 2016/0014019 A1    Jan. 14, 2016

Related U.S. Application Data

(63) Continuation of application No. PCT/JP2013/058359, filed on Mar. 22, 2013.

(51) Int. Cl.
| | |
|---|---|
| H04L 12/26 | (2006.01) |
| H04L 12/707 | (2013.01) |
| H04W 40/30 | (2009.01) |
| H04L 12/24 | (2006.01) |
| H04L 12/703 | (2013.01) |
| H04W 40/34 | (2009.01) |

(52) U.S. Cl.
CPC .......... H04L 45/22 (2013.01); H04L 41/0654 (2013.01); H04L 41/0663 (2013.01); H04L 45/28 (2013.01); H04W 40/30 (2013.01); H04W 40/34 (2013.01)

(58) Field of Classification Search
CPC ..... H04L 45/22; H04L 45/28; H04L 41/0654; H04W 40/30; H04W 40/34
See application file for complete search history.

(56) References Cited

U.S. PATENT DOCUMENTS

2011/0038274 A1    2/2011    Ikemoto et al.

FOREIGN PATENT DOCUMENTS

| JP | 2002-252625 | 9/2002 |
| JP | 2009-206872 | 9/2009 |
| JP | 2009-267532 | 11/2009 |
| JP | 2012-199703 | 10/2012 |

OTHER PUBLICATIONS

Takashi Saito et al., "Method of Fault Location based on Importance for Remote Maintenance of Sensor Network", Mar. 18, 2008, IEICE (4 pages), with English translation.
International Search Report, mailed in connection with PCT/JP2013/058359 and mailed Jun. 18, 2013 (1 page).

*Primary Examiner* — Afshawn Towfighi
(74) *Attorney, Agent, or Firm* — Fujitsu Patent Center

(57) ABSTRACT

A wireless terminal device includes a transmitter configured to receive a first packet including path information and a first number of paths of each path and a second packet including a second number of paths between a transmission origin wireless terminal device and a destination wireless terminal device, which is sent from the transmission origin wireless terminal device, and a processor configured to multiply the first number of the paths between an own wireless terminal device and the transmission origin wireless terminal device with another first number of paths between the own wireless terminal device and the destination wireless terminal device and calculate a number of alternative paths of the own wireless terminal device by subtracting the multiplied value from the second number of the paths which is received.

7 Claims, 20 Drawing Sheets

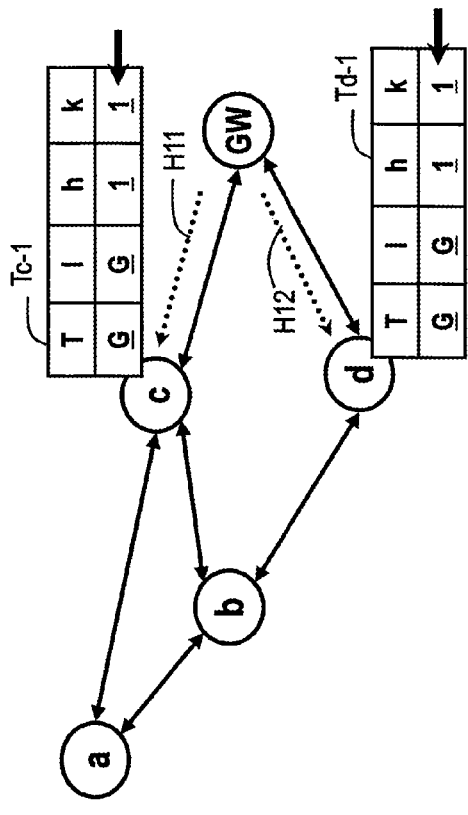
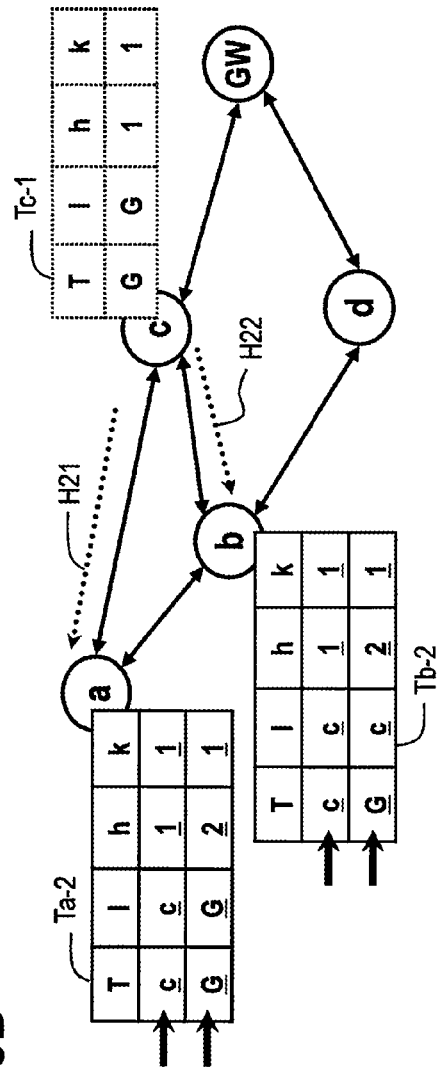
FIG. 5A
FIG. 5B

WIRELESS TERMINAL DEVICE, METHOD FOR GENERATING NUMBER OF ALTERNATIVE PATHS, AND WIRELESS COMMUNICATION SYSTEM

CROSS-REFERENCE TO RELATED APPLICATION

This application is a continuation application of International Application Number PCT/JP2013/058359 filed on Mar. 22, 2013 and designated the U.S., the entire contents of which are incorporated herein by reference.

FIELD

The embodiments discussed herein relate to a wireless terminal device, method for generating number of alternative paths, and a wireless communication system.

BACKGROUND

In late years, ad hoc network system, of which a wireless terminal device each interconnects autonomously, is suggested. In the ad hoc network, the access point is not established, and the wireless terminal device each relays the packet, which is received from the wireless terminal device to connect with an own terminal device mutually, to an adjacency terminal based on path information, thereby forming the path (also called a channel or course). And, for example, sensor data which is measured at each wireless terminal device are relayed by one or more wireless terminal devices based on a generated path, thereby transmitting to an objective terminal (for example, patent literature one or two).

By such a system, the system failure such as breakdowns of the wireless terminal device and outage of dead battery of the wireless terminal device occur frequently. By the occurrence of the system failure, it is not possible that the wireless terminal device of the broadcast transmits and receives data, and the sensor data are not sent to the objective terminal. Therefore, handling (for example, repair, or substitution of the device and the battery) by the hands for the failure of the wireless terminal device is needed. However, when a wireless terminal device needing the handling is a majority, it is difficult to deal with the failure of a large number of wireless terminal devices immediately because the available staff may be limited.

Therefore, for example, the handling of the wireless terminal device of the minor fault is performed in a mass, not but immediately. In this way, it is planned that the handling for the failure is efficiency. For example, the priority for the handling of the failure is set based on the importance of the wireless terminal device. In the case of the ad hoc network, the substitute of the wireless terminal device of the broadcast is enabled by changing to another path relaying other wireless terminal device dynamically depending on the wireless terminal device which the failure has occurred. On the other hand, depending on the placement of the wireless terminal device, an alternative path may not exist. Therefore, for example, the importance of the wireless terminal device is calculated based on the number of the alternative paths and the number of the paths going by way of a target node.

CITATION LIST

Patent Literature

[patent literature 1] Japanese Laid-Open Patent Publication No. 2012-199703.

[patent literature 2] Japanese Patent Publication No. 4941397.

Non-Patent Literature

[non-patent literature 1] Proceedings of the 2008 IEICE general conference of Institute of Electronics, Information and Communication Engineers, No. 2, 573 pages "failure pointing technique based on the importance in the remote maintenance of the sensor network".

SUMMARY

However, the appointed terminal collects the adjacent table in all wireless terminal devices and calculates the number of the alternative paths based on the path information built based on the information in the adjacent table of each wireless terminal device. Therefore, because quantity of communication increases for the collection of adjacent tables, the load is applied to the network, and a large amount of storage capacity of the terminal device is required, because of the storage of the adjacent table. In addition, it is easy that the terminal where an adjacent table is gathered makes a high load state, because the terminal calculates an alternative path by repeating the processing that is equal to path construction based on the adjacent table, therefore needs time for processing.

According to a first aspect of the embodiment, a wireless terminal device includes a transmitter configured to receive a first packet including path information and a first number of paths of each path, which is sent from another wireless terminal device which connects with mutually, and a second packet including a second number of paths between a transmission origin wireless terminal device and a destination wireless terminal device, which is sent from the transmission origin wireless terminal device, and a processor configured to multiply the first number of the paths between an own wireless terminal device and the transmission origin wireless terminal device with another first number of paths between the own wireless terminal device and the destination wireless terminal device and calculate a number of alternative paths of the own wireless terminal device by subtracting the multiplied value from the second number of the paths which is received.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 5A and 5B are first diagrams explaining generation processing of path information based on the HELLO packet.

DESCRIPTION OF EMBODIMENTS

An embodiment of the present invention will be described below with reference to the drawings. It is to be noted that the technical scope of the present invention is not limited to the embodiment, and includes matters described in the claims and their equivalents.

[Constitution of the Ad Hoc Network System]

Figure 1:
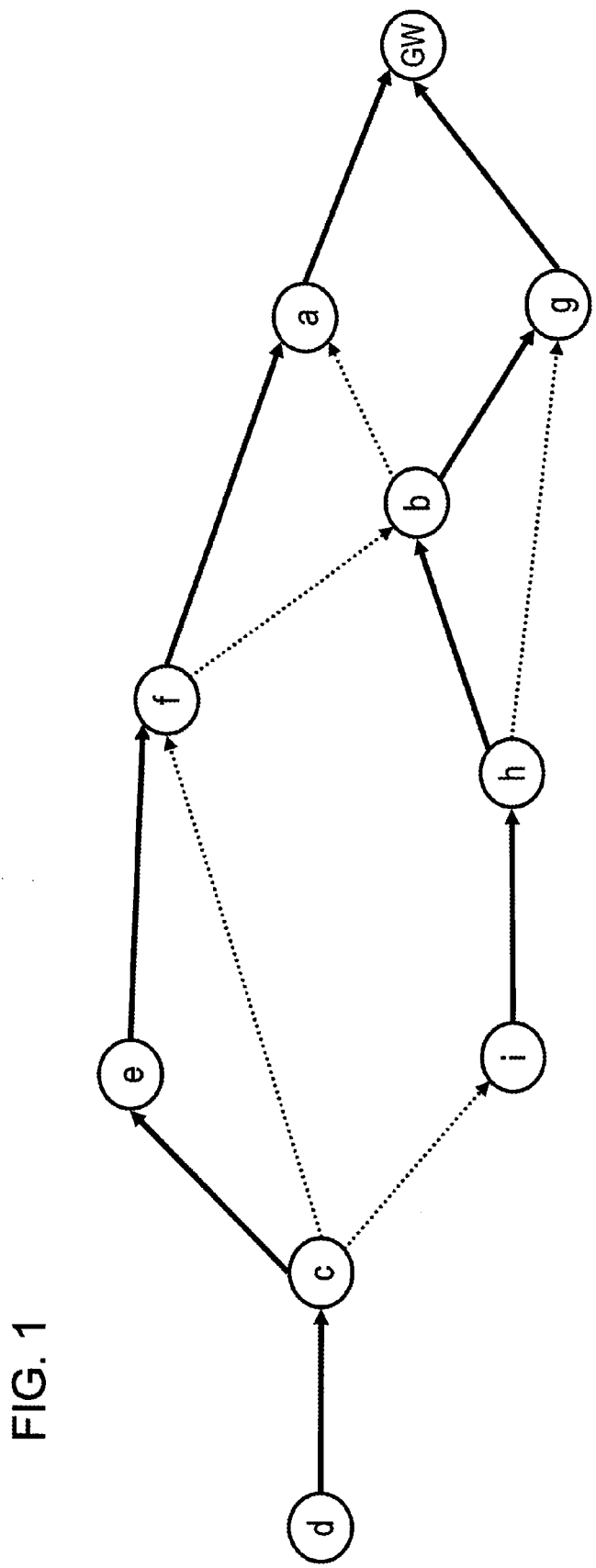
FIG. 1 is a diagram indicating the whole constitution of the ad hoc network system according to the embodiment.

FIG. 1 is a diagram indicating the whole constitution of the ad hoc network system according to the embodiment. In FIG. 1, the wireless terminal device GW is a gateway. In the ad hoc network system, each wireless terminal device "a"-"i" performs routing autonomously and performs multi-hop communication. In FIG. 1, for example, the solid line represents a data transfer path generated by the routing and the dotted line represents a path which is able to communicate mutually, but, do not correspond to the data transfer path. For example, the data measured in the wireless terminal device "d" arrive at the gateway "GW" via the wireless terminal device "c", the wireless terminal device "e", the wireless terminal device "f" and the wireless terminal device "a". The wireless terminal device is called as a node as follows.

[Constitution of the Node]

Figure 2:
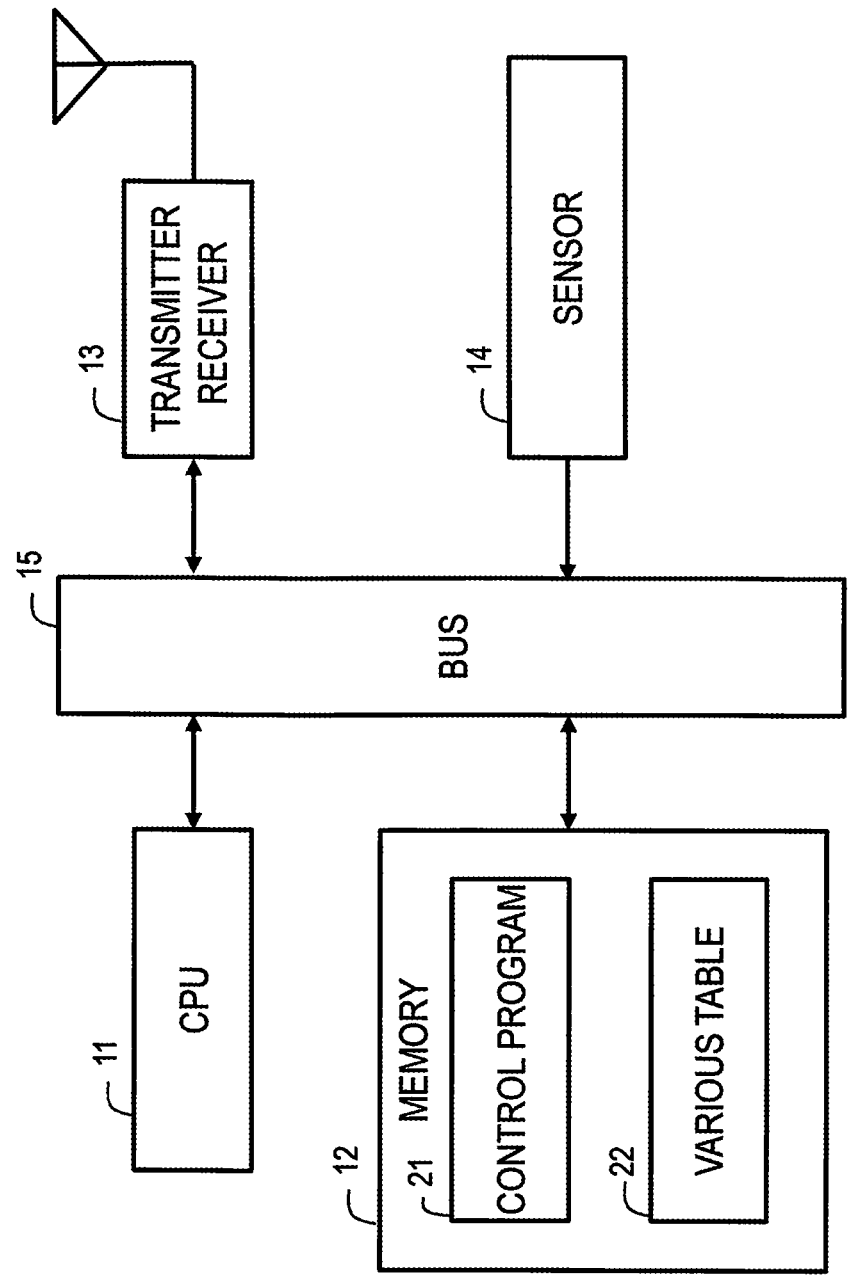
FIG. 2 illustrates an example of the constitution of the node according to the embodiment.

FIG. 2 illustrates an example of the constitution of the node according to the embodiment. The node has, for example, a processor 11, a memory 12, a sensor 14, and a transmitter receiver 13. The all parts are connected through a bus 15 mutually. The memory 11 stores, for example, control program 21 and various table 22 produced by the control program 21. The CPU (processor) 11 collaborates with the control program 21 and performs the calculation processing of the number of the alternative paths according to the embodiment. In addition, these processing may be realized by hardware which performs equivalent step. The sensor 14 measures, for example, a predetermined object and generates sensor data. The transmitter receiver 13 is, for example, antennas, etc. and, transmits and receives data packet having sensor data and a control packet for communication based on control by the control program 21.

[Block Diagram of the Node]

Figure 3:
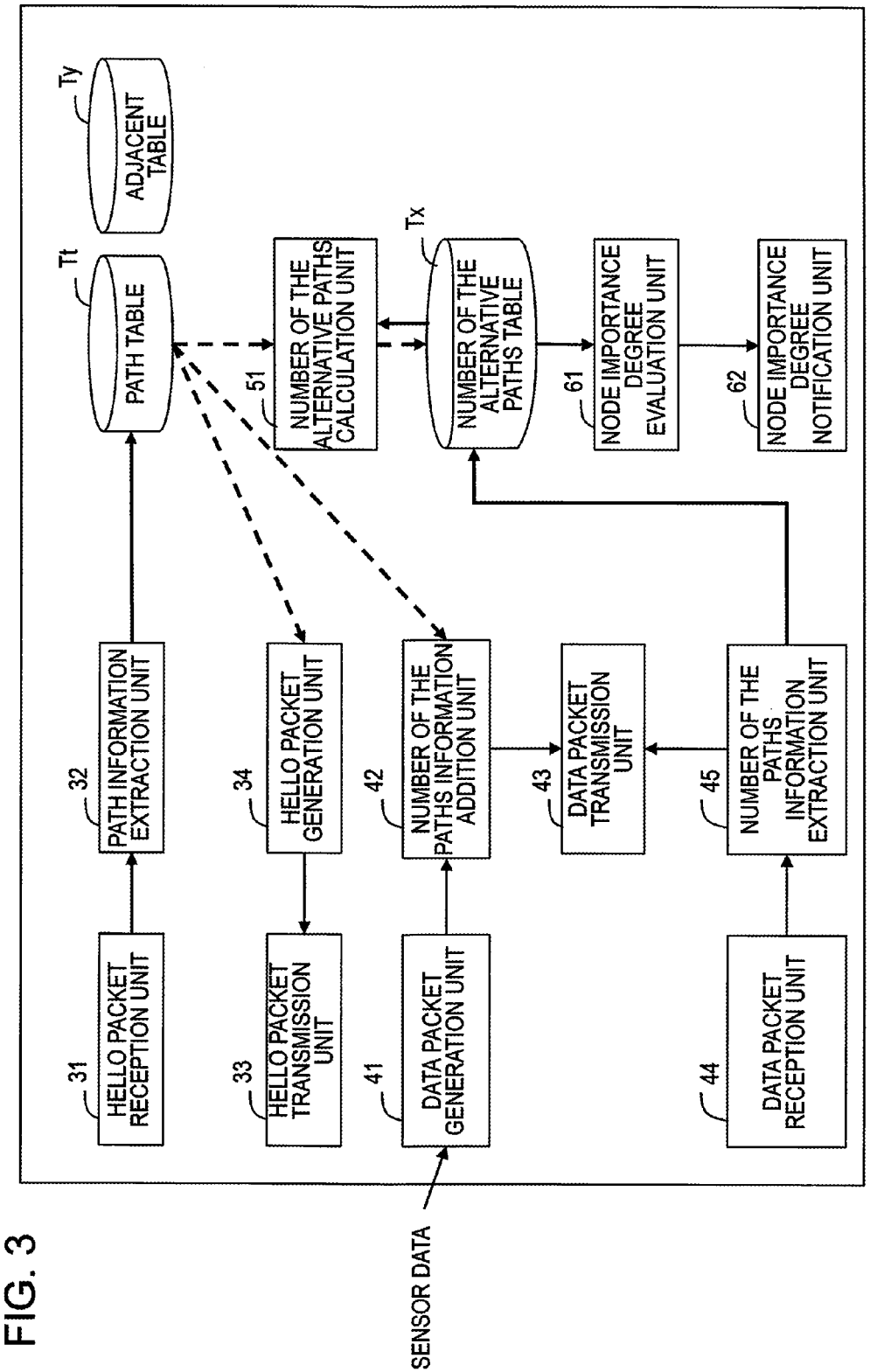
FIG. 3 is a diagram indicating an example of the software block diagram of the node.

FIG. 3 is a diagram indicating an example of the software block diagram of the node. The node in FIG. 3 has, for example, a HELLO packet reception unit 31, a HELLO packet transmission unit 33, a HELLO packet generation unit 34, path information extraction unit 32, a path table Tt, an adjacent table Ty. The adjacent table Ty is a table having the information of the adjacent node. Further, a HELLO packet is a special packet that is sent out periodically from a router to establish and confirm network adjacency relationships in the Open Shortest Path First (OSPF).

The HELLO packet reception unit 31 receives the HELLO packet, and the path information extraction unit 32 extracts path information and the number of the paths from the data included in the HELLO packet which is received and stores it in the path table Tt. The path information is, for example, the information indicating the path when an own node transmits a packet to a node of a destination (destination node). In addition, the HELLO packet generation unit 34 generates the HELLO packet having the path information and the number of the paths with reference to the path table Tt. And the HELLO packet transmission unit 33 transmits the generated HELLO packet.

In addition, the node depicted by FIG. 3 has a data packet generation unit 41, a number of the paths information addition unit 42, a data packet transmission unit 43, a data packet reception unit 44, a number of the paths information extraction unit 45, a number of the alternative paths calculation unit 51. The data packet generation unit 41 generates the data packet. The data packet indicates a packet having predetermined data and transmitted to a specific destination node.

In addition, the number of the paths information addition unit 42 adds the total number of the paths from the own node to the destination node to the data packet. In addition, the data packet transmission unit 43 sends the data packet having sensor data. The data packet reception unit 44 receives the data packet and extracts the total number of the paths included in the data packet and stores it in a number of the alternative paths table Tx. The number of the alternative paths calculation unit 51 calculates the number of the alternative paths of own node with reference to the path table Tt and the number of the alternative paths table Tx. And the number of the alternative paths of the own node which is calculated is stored in the number of the alternative paths table Tx.

In addition, the node depicted by FIG. 3, for example, has a node importance degree evaluation unit 61, and a node importance degree notification unit 62. The node importance degree evaluation unit 61 acquires the number of the alternative paths with reference to the number of the alternative paths table Tx, and generates the importance degree. The node importance degree notification unit 62 notifies generated importance degree.

Here, a summary of the process of the node according to the embodiment will be explained.

[Summary of the Process of Node]

Figure 4:
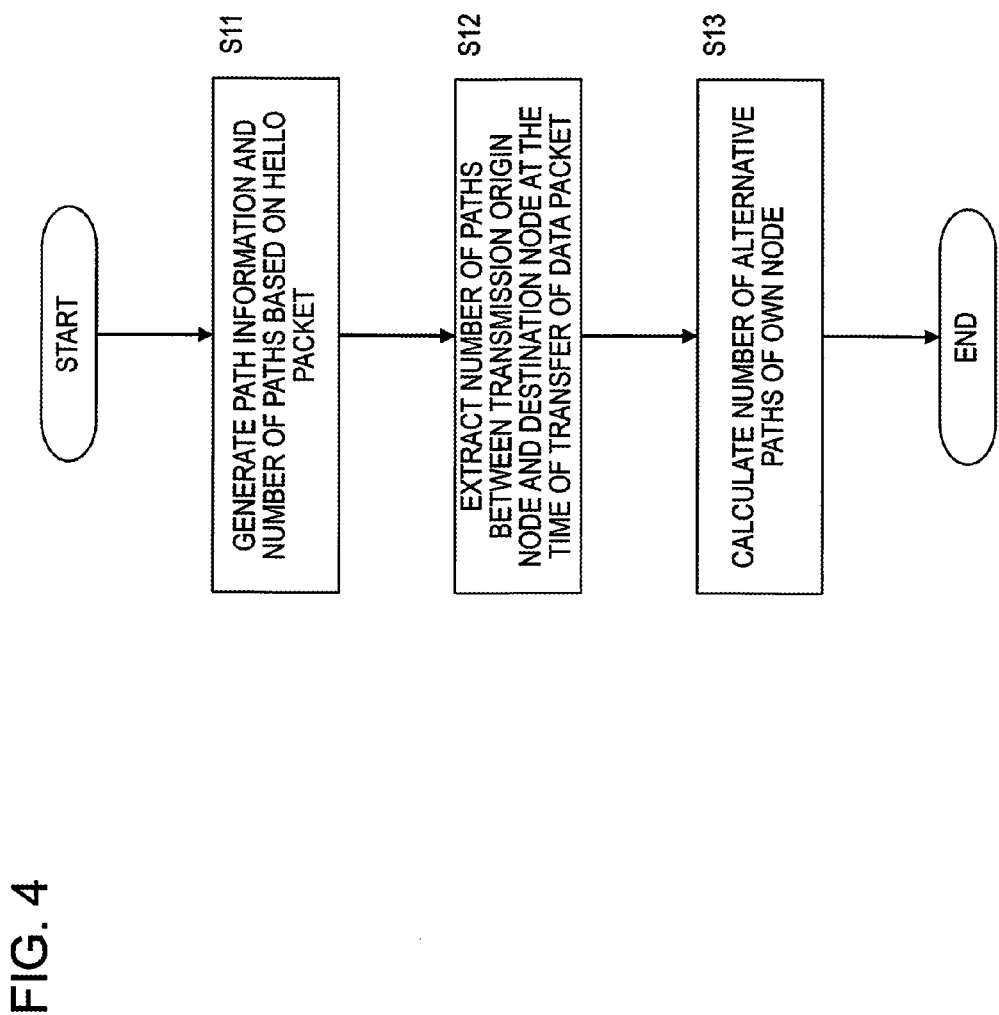
FIG. 4 is a flow chart diagram explaining a summary of the processing of node according to the embodiment.

FIG. 4 is a flow chart diagram explaining a summary of the processing of node according to the embodiment. The node according to the embodiment receives a first packet including the path information and the number of the first path of each path from the node which is connected to an own node mutually and stores path information and the number of the first path. And the node receives the second packet including the number of the second path between the node of a transmission origin (transmission origin node) and the destination node and calculates the value which is subtracted a multiplication value with the first number of the paths between the own node and the transmission origin node and the first number of the paths between an own node and the destination node from the number of the second paths, as the number of the alternative paths of the own node.

In the flow chart diagram of FIG. 4, at first the node generates the path information between an own node and accessible other nodes based on the HELLO packet (the first packet) (S11). In this time, in the embodiment, the node generates the number of the paths (the first number of the paths) of each path in addition to the path information, based on the HELLO packet. Therefore, at first, the number of the paths (the first number of the paths) between the own node and accessible other nodes is generated.

And, at the time of transfer of the data packet (the second packet), the node which performs the relay extracts the number of the paths (the second number of the paths) between the transmission origin node and the destination node of the data packet from the data packet (S12). The total number of the paths between the transmission origin node and the destination node is provided to the data packet by the transmission origin node beforehand. And the node calculates the number of the alternative paths of the own node, based on the total number of the paths (the second number of the paths) between the transmission origin node and the destination node, which is extracted in the step S12, and the number of paths (the first number of the paths) which is generated in the step S11 (S13).

Next, the processing of each step in the flow chart diagram of FIG. 4 will be described concretely. At first, the generation processing (S11) of the path information based on the HELLO packet in the flow chart diagram of FIG. 4 will be described.

[Generation (S11 of FIG. 4) of the Path Information Based on the HELLO Packet]

FIG. 5A-FIG. 9 are diagrams explaining generation processing of path information based on the HELLO packet according to the embodiment. FIG. 5-FIG. 9 illustrate a part of the ad hoc network according to the embodiment. In the example of the FIG. 5A-FIG. 9, the node GW indicates a gateway. In this example, each of the path tables has the destination node "T", the adjacent node "l" for go by way of in the path to the destination node "T", the number of the hops "h" until the destination node "T", the number of the paths "k" between the own node and the destination node "T". In addition, in the path table, the node GW is written as "G".

In the present embodiment, the control packet called the HELLO packet is used for generation of the path information. The node broadcasts the HELLO packet regularly. And the node transmits and receives the HELLO packet and exchanges the path information and generates the path table. In addition, in the present embodiment, the number of the paths is added to the HELLO packet in addition to the path information.

When the node receives the HELLO packet, based on the path information that the HELLO packet has, the node updates the path table of the own node. Especially, when the node receives the HELLO packet, the node adds the information of the path, which do not exist in the path table of the own node in the path information that HELLO packet has, to the path table of the own node with the number of the paths "k". In addition, when the HELLO packet has the path information having less number of the hops "h" than the path information in the path table, the node overwrites the path information that the HELLO packet has in the path table. In addition, when a plurality of paths which have same destination node "T" and same link "l" exist, the node registers the grand total of the number of the paths with the path table. In this way, the path table is produced. Next, a specific example will be described.

In FIG. 5A, the node GW transmits, for example, the HELLO packets H11, H12 indicating that an own node exists on the network to the adjacent node "c" and node "d". The node "c" generates the path information based on the HELLO packet H11 which is received and store it in the path table Tc-1. Especially, the node "c" generates the path information indicating one hop (h) from the own node "c" to the node GW (T). In addition, the number of the paths between the node "c" and the node GW is one. Therefore, the number of the paths 1 (k) is registered.

In FIG. 5A, as same as the node "c", the node "d" receives the HELLO packet H12 transmitted by the node GW. Based on the HELLO packet H12 which is received, the node "d" generates the path information indicating 1 hop (h) from the own node "d" to the node GW (T) and the number of the paths 1 (k) and stores it in the path table Td-1. In this way, the node determines that the number of the paths (k) is 1 when the node firstly generates the path to an adjacent node.

FIG. 5B exemplifies a case that the node "c" transmits the HELLO packets H21, H22 to the node "a" and the node "b". In the example, the HELLO packet H21 has the path information indicating that the node "c" is one hop (h) to the node GW. Therefore, the node "a" adds the path information indicating two hop (h) to the node GW (T) via the node c (l), and the number of the paths 1 (k) to the path table Ta-2, based on the path information that the HELLO packet H21 has. In this time, the number of the paths number (k) in which the HELLO packet has is copied to the path table. In this way, the path information is extended by changing the link (l) and the hop (h) in the path information that the HELLO packet H21 has and adding it to the path table Ta-2 of the own node "a". In addition, the node "a" adds the path information indicating 1 hop (h) to the node C (T) and the number of the paths 1 (k) to the path table Ta-2.

In addition, the node "b" adds the path information indicating one hop to the node "c" and the number of the paths 1 (k), and the path information indicating two hop (h) to the node GW (T) via the adjacent node c (l) and the number of the paths 1 (k), to the path table Tb-2. In this way, the path information is extended by the propagation of the HELLO packet.

Figure 6A:
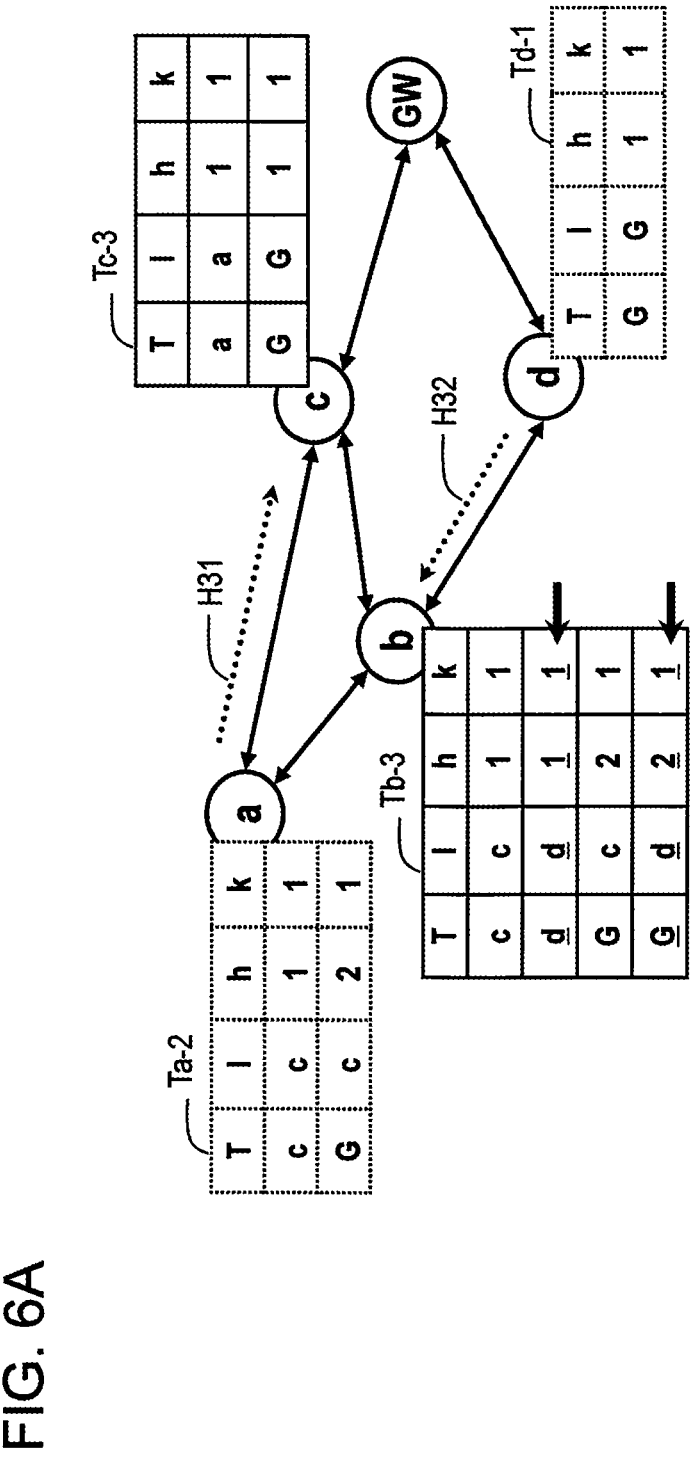
FIGS. 6A and 6B are second diagrams explaining generation processing of path information based on the HELLO packet.
Figure 6B:
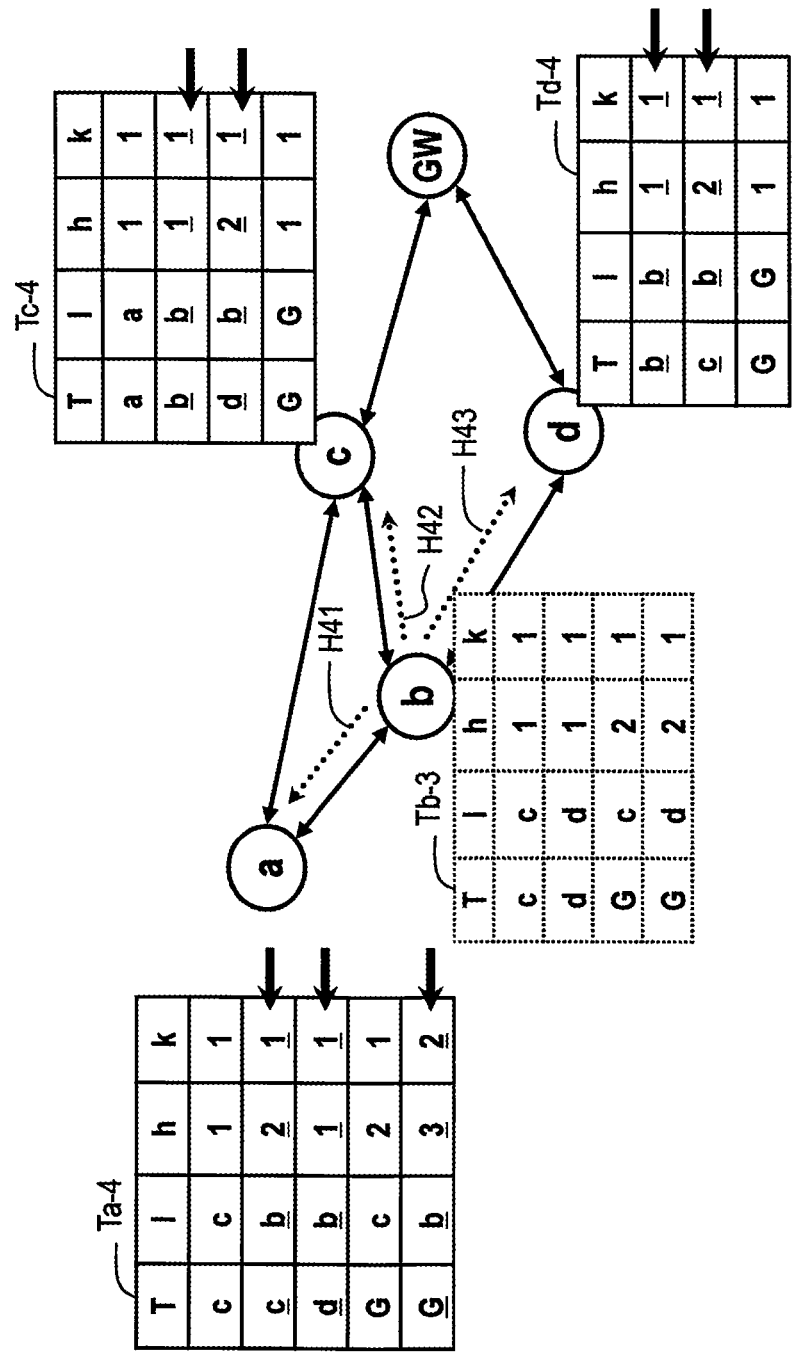

FIG. 6A and FIG. 6B are diagrams explaining the process which follows to the process in FIG. 5B in the specific example of the generation process of path information based on the HELLO packet. When the node "a" transmits the HELLO packet H31 to the node "c" successively as represented by FIG. 6A, the node "c" generates the path information based on the path information included in the HELLO packet. The HELLO packet H31 has the path information of being two hop (h) to the node GW (T) via the node "c". However the path table Tc-3 of the node "c" already has the path information of being one hop to the node GW (T). In this case, for example, the node "c" does not need to add the path information, which is the non-efficiency of being three hop (h) until the node GW (T) via the node a (l), to the path table Tc-3.

In this way, the path added to the path table may be limited based on the hop (h) which is a length of path. For example, in an example of FIG. 6A, the path (path via node "a") of three hops, which is longer two hops more than the number of the shortest hops "one" to the same destination node GW (T) in the path table, is excluded. In this way, the path that is non-efficiency is excluded by excluding a path based on the number of the hops. Therefore, error of the calculated number of the alternative paths is evaded. The details will be mentioned later.

In addition, in FIG. 6A, when the node "b" receives the HELLO packet H32 from the node "d", the node "b" adds path information of being one hop (h) to the node d (T) and number of the paths 1 (k) and path information of being two hop (h) to the node GW (T) via the adjacent node d (l) and number of the paths 1 (k) to the path table Tb-3.

In FIG. 6B, the node "b" transmits the HELLO packets H41-H43 to the node "c", the node "a", and the node "d" successively. When the node "a" receives the HELLO packet H41 from the node "b", the node "a" adds the path information to the node b (T) and number of the paths 1 (k) and the path information to the node c (T) via the node b (l) and number of the paths 1 (k). In addition, the path table Tb-3 in the node "b" has two path information via the node c (l) or the node d (l) until the destination of the node GW. Therefore, the node "a" adds the path information to the node GW (T) via the node b (l) and the number of the paths 2 (k) to the path table Ta-4. In this way, when there are multiple paths with the link (l) until the destination node, the node stores the sum of number of the paths in the path table. Similarly, the path tables Tc-4 and Td-4 are updated based on the HELLO packets H42, H43.

In this way, when there are multiple paths from the link (l) to the destination node (T), the sum of the paths is stored, as the number of the paths which relay the link (l) until the destination node from the own node, into the path table. Therefore, based on the path table, it is possible to detect the number of the paths (k) in addition to the path information. The continuance of the specific example will be described.

Figure 7:
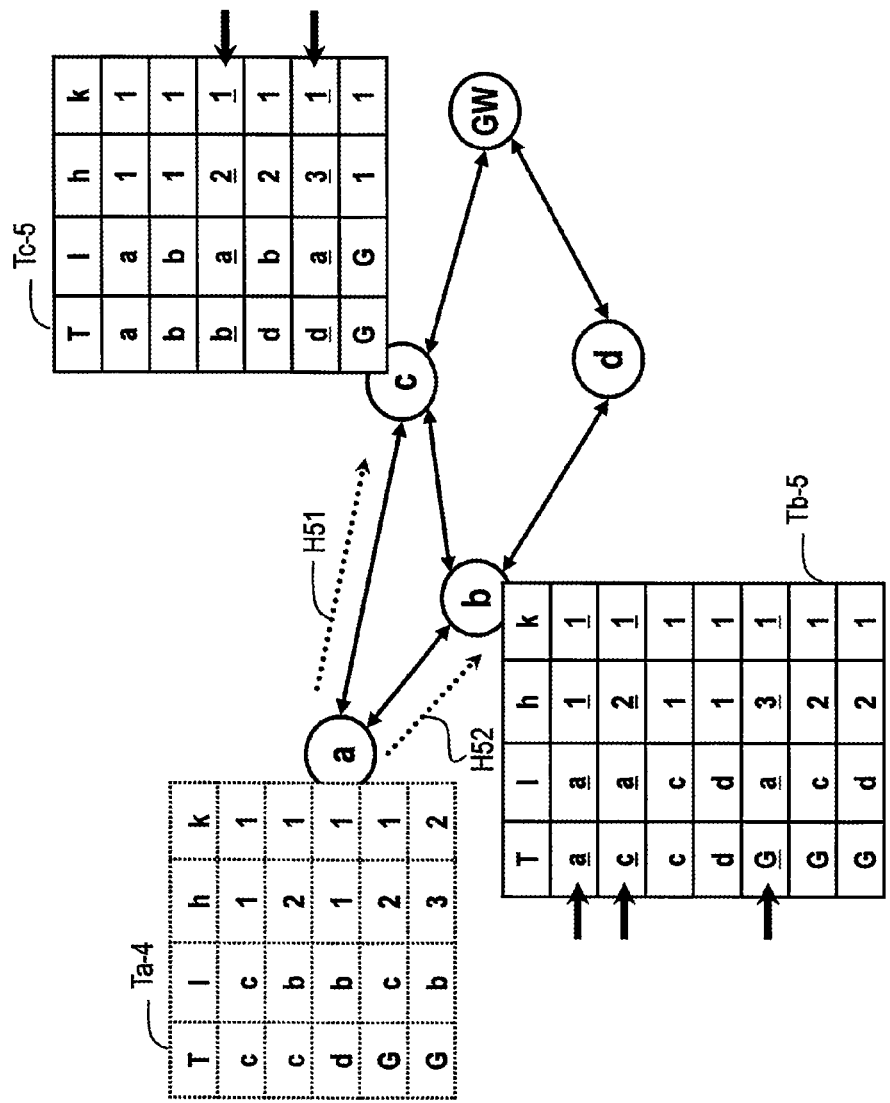
FIG. 7 is a third diagram explaining generation processing of path information based on the HELLO packet.

FIG. 7 is a diagram explaining the process which follows in FIG. 6B of the specific example of the generation process of path information based on the HELLO packet. In FIG. 7, the node "a" transmits the HELLO packets H51, H52 to the node "b" and the node "c" successively. By this transmission, three path information and the number of the paths (k) via the node "a" (l) are added to the path table Tb-5 in the node "b". In addition, two path information and the number of the paths (k) in which the node "a" is the link (l) are added to the path table Tc-5 in the node "c".

Figure 8:
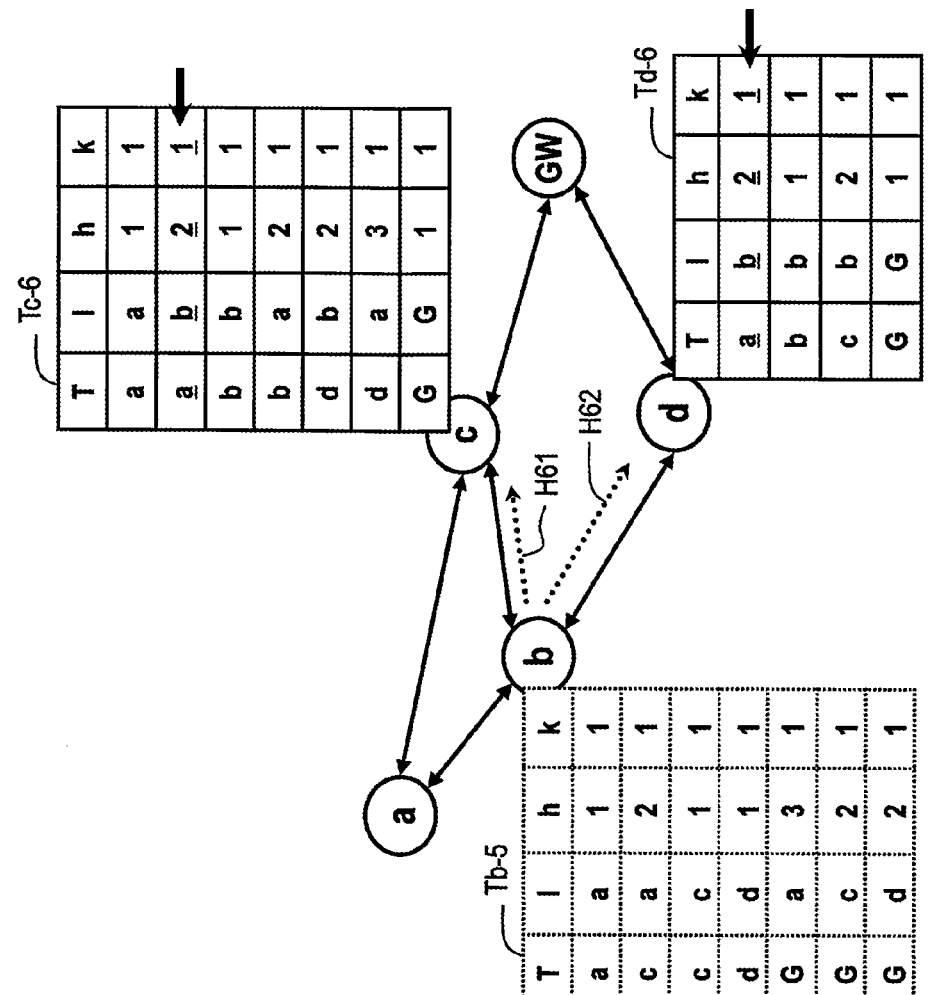
FIG. 8 is a fourth diagram explaining generation processing of path information based on the HELLO packet.

FIG. 8 is a diagram explaining the process which follows to FIG. 7 in the specific example of the generation process of path information based on the HELLO packet. In FIG. 8, the node "b" transmits the HELLO packets H61, H62 to the node "c" and the node "d". The path table Tc-6 in the node "c" already has the path information in which the node "b" is the link (l), but does not have the path information of the destination node a (T) in which the node "b" is the link. Therefore, the node "c" adds the path information of the destination node a (T) of which the node "b" is the link (l) and the number of the paths 1 (k) to the path table Tc-6. Similarly, the node "d" adds the path information of the destination node a (T) of which the node "b" is the link (l) and the number of the paths 1 (k) to the path table Td-6.

Figure 9:
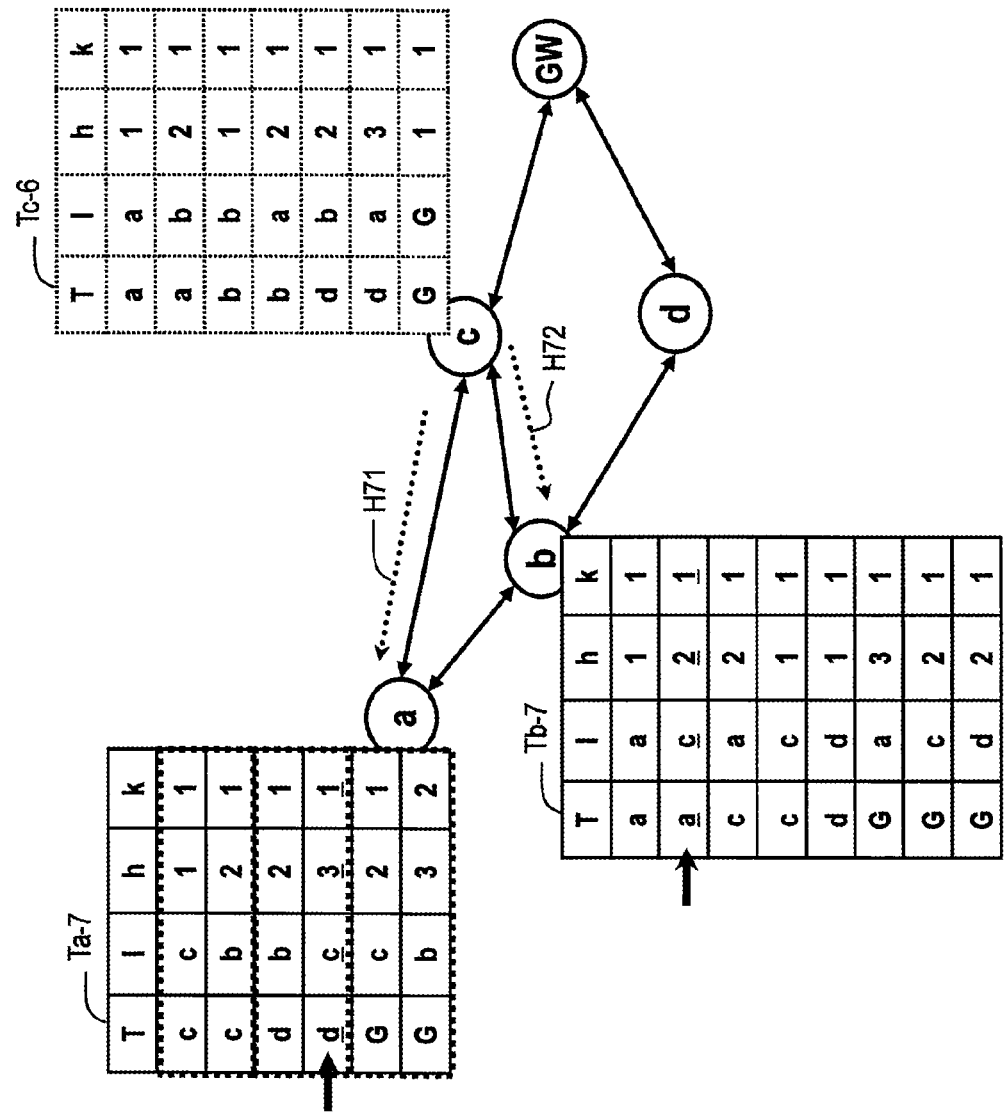
FIG. 9 is a fifth diagram explaining generation processing of path information based on the HELLO packet.

FIG. 9 is a diagram explaining the process which follows to FIG. 8 in the specific example of the generation process of path information based on the HELLO packet. In FIG. 9, the node "c" transmits the HELLO packets H71, H72 to the node "a" and the node "b". As same as FIG. 8, the node "a" adds the path information of the destination node d (T) and the number of the paths 1 (k) of which the node "c" is the link (l) to the path table Ta-7. Similarly, the node "b" adds the path information of the destination node a (T) and the number of the paths 1 (k) of which the node "c" is the link (l) to the path table Tb-7.

In this way, the path table having multiple paths about the same destination node due to the difference of the propagation path of the HELLO packet is produced. For example, the path table Ta-7 in the node "a" in FIG. 9 has two paths that the node "c" is a destination node, two paths that the node "d" is a destination node, and three paths that the node GW is a destination node as represented by surrounding with a dotted line.

[Number of the Paths]

Figure 10:
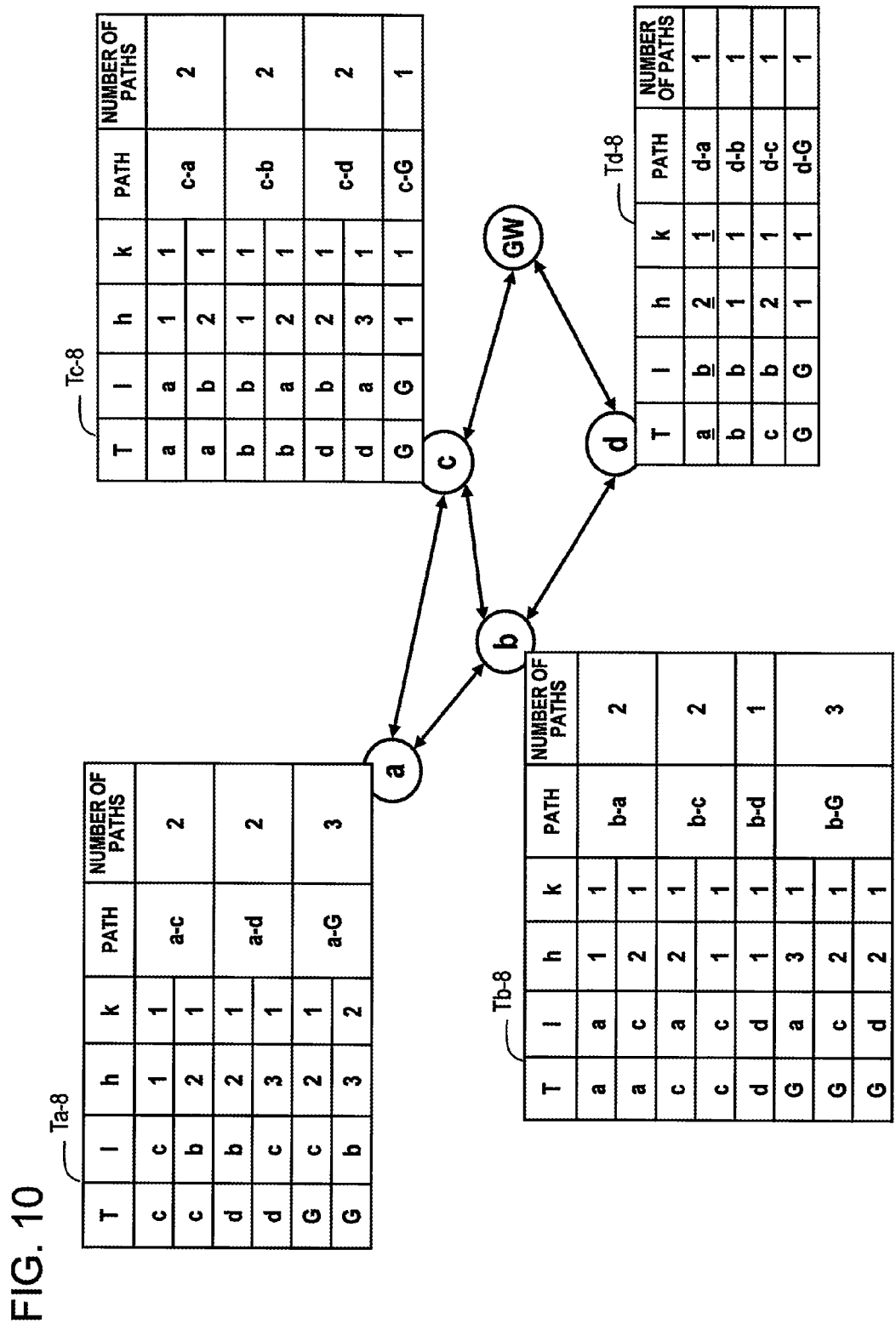
FIG. 10 is a diagram explaining each path and the number of the paths of which the path information has.

FIG. 10 is a diagram explaining each path and the number of the paths of which the path information has. Each of tables Ta-8-Td-8 in FIG. 10 has a total number of the paths between a transmission origin node and a destination node (T) corresponding to the path information in addition to the information of the path table in FIG. 9.

The path table in the node "a" of FIG. 10 has a single path (node "a"→node "c"→node GW) of which the adjacent node "c" is the link (l) and two paths (node "a"→node "b"→node "c"→node GW/node "a"→node "b"→node "d"→node GW) of which the adjacent node "b" is the link (l) as paths between the node "a" and the node GW (T), as described above. In other words, the path table Ta-8 in the node "a" has three paths that the node GW (T) is a destination address.

Similarly, the path table Ta-8 in the node "a" of FIG. 10 has single path (node "a"→node "c") of which the adjacent node "c" is the link (l) and single path (node "a"→node "b"→node "c") of which the adjacent node "b" is the link (l), as paths between the node d (T). This means that the path table Ta-8 has two paths that the node "c" is a destination address. Similarly, the path table Ta-8 has two paths (node "a"→node "b"→node "d"/node "a"→node "c"→node GW→node "d") of which the node d (T) is a destination address.

In addition, in FIG. 10, the path table Tb-8 in the node "b" has paths of which the node "a", the node "c", the node "d" are the link (l) each, as the path in which the node GW (T) is a destination address. In other words, the path table Tb-8 has three paths of which the node GW (T) is a destination address. In addition, the path table Tb-8 has two paths of which the node "a" is a destination address, two paths of which the node "c" is a destination address, and single path of which the node "d" is a destination address. The path table of other nodes is similar.

In this way, according to the embodiment, it is possible to calculate the number of the total paths between the own node and the destination node in addition to the path information between the own node and the destination node automatically by adding the number of the paths to the HELLO packet (S11 of FIG. 4). Next, the processing of the step S12 in the flow chart of FIG. 4 will be described. In the step S12, the node extracts the total number of the paths between the transmission origin node and the destination node of data packet at the time of data packet broadcast. The number of the paths which is extracted is used in the calculation process of the alternative paths (S13 of FIG. 4).

[Extraction Processing (S12) of Number of the Paths Between a Transmission Origin Node and the Destination Node]

Figure 11:
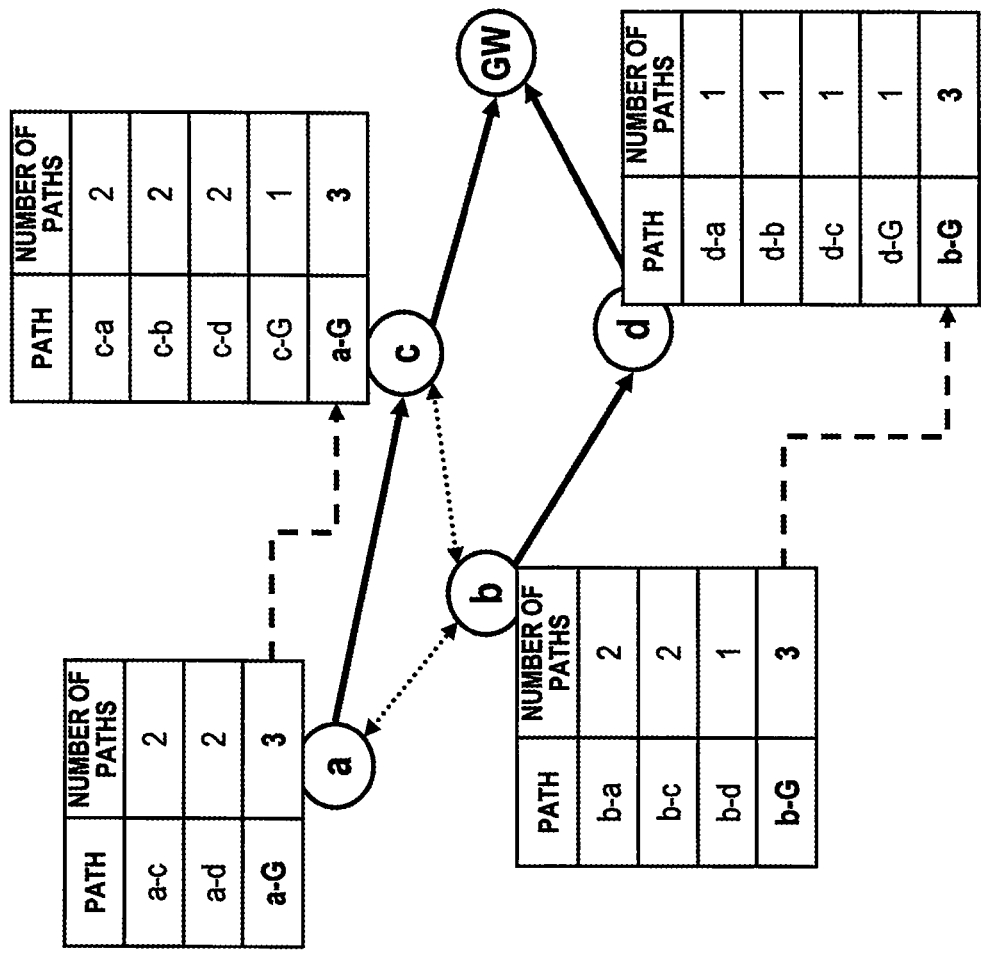
FIG. 11 is a diagram explaining extraction processing (process S12) of number of the paths between a transmission origin node and the destination node in the flow chart of FIG. 4.

FIG. 11 is a diagram explaining extraction processing (process S12) of number of the paths between the transmission origin node and the destination node in the flow chart of FIG. 4. In this example, an arrow of the solid line represents a transmission path of the data packet, and the arrow of the dotted line represents a path which is able to communicate mutually, but a path not to correspond to the transmission path of the data packet. In the example of FIG. 11, for example, the node "a" sends the data packet having the sensor data which is measured, to the node GW via the node "c". In this case, the node "a" is the transmission origin node, and the destination node is the node GW. In addition, in the example of FIG. 11, for example, the node "b" sends the data packet having the sensor data which is measured, to the node GW via the node "d". In this case, the transmission origin node is the node "b", and the destination node is the node "d". In addition, the node "c" and the node "d" may become the transmission origin node each.

At first, a case that the data packet is sent to the destination node GW from the node "a" is exemplified. In this case, the transmission origin node "a" adds total number of the paths "3" between the own node "a" and the destination node GW to the data packet. And the relaying node "c" extracts the total number of the paths "3" between the node "a" and the destination node GW, included in the data packet, when relaying the data packet (S12). It is similar about the case that the data packet is sent to the destination node GW from the node "b". The relaying node "d" extracts the total number of the paths "3" between the transmission origin node "b" and the destination node GW, included in the data packet, when relaying the data packet (S12). In this way, in the present embodiment, the total number of the paths between the transmission origin node and the destination node is transmitted to each relaying node.

In this way, the total number of the paths between the transmission origin node and the destination node is effectively transmitted to a relaying node by adding it to the existing data packet. Because the size of the field storing the total number of the paths is small, and the number of the data packet does not increase, the load of the network does not increase. Next, the processing of process S13 in the flow chart of FIG. 4 will be described. In the process S13, the node calculates the number of the alternative paths of own node based on the total number of the paths between a relaying node and the destination node or the transmission origin node when relaying the data packet. Here, the calculation method of the number of the alternative paths will be described.

[Calculation Method of the Alternative Path]

Figure 12:
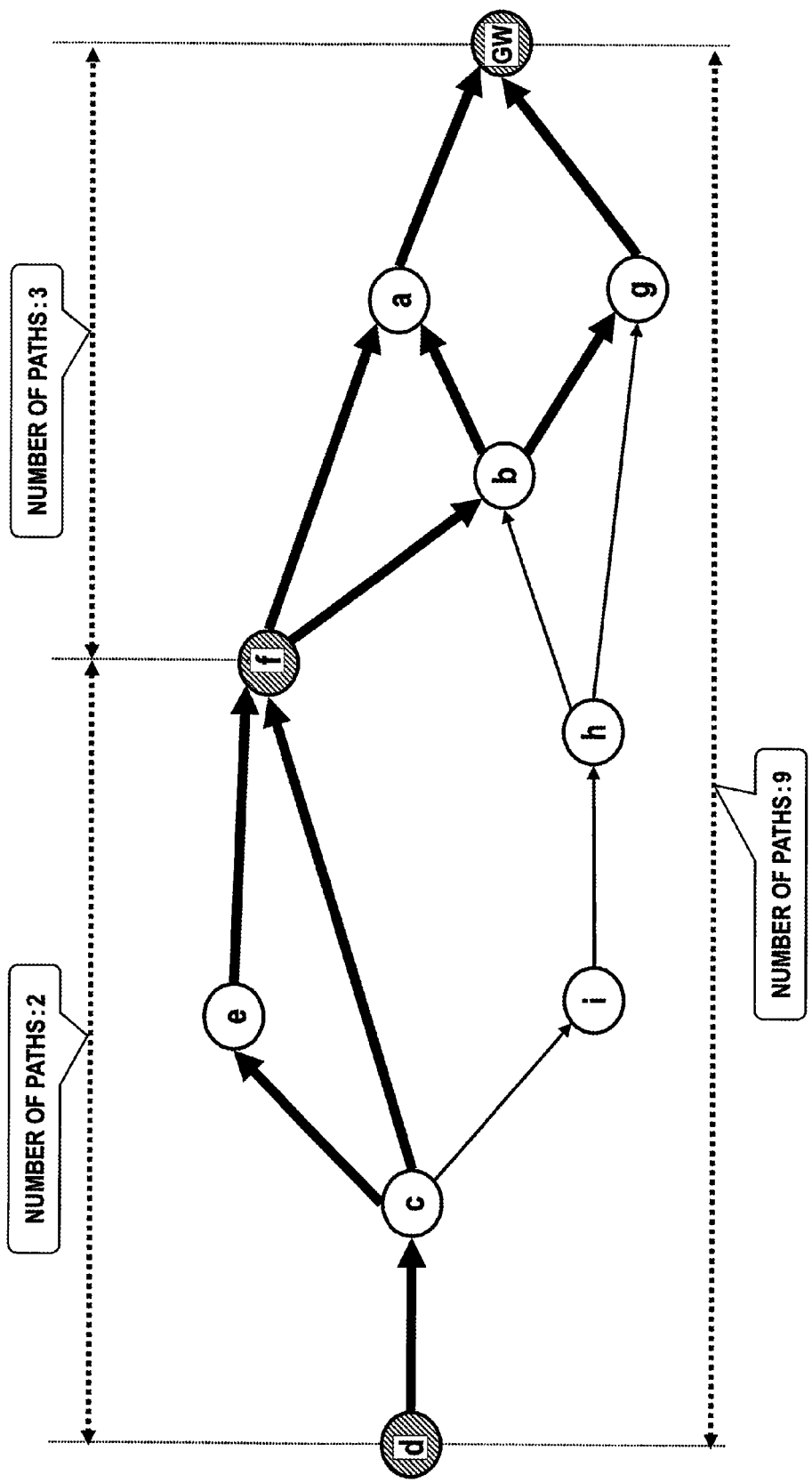
FIG. 12 is a diagram explaining the calculation method of the number of the alternative paths.

FIG. 12 is a diagram explaining the calculation method of the number of the alternative paths. In the example of FIG. 12, the transmission origin node of the data packet is the node "d", and the destination node is the node GW. In this example, the calculation method of the number of the alternative paths of the relaying node "f" in paths from the transmission origin node "d" to the destination node GW is exemplified. In the present embodiment, the number of the alternative paths is calculated according to the calculating formula of "(total number of the paths between the transmission origin node and the destination node)−(the number of paths relaying the node)". In addition, the number of the paths relaying the node indicates "(the number of the paths between the node and the transmission origin node)*(the number of the paths between the node and the destination node)".

In an example of FIG. 12, the total number of the paths between the transmission origin node "d" and the destination node GW is nine. In addition, the number of first paths between the transmission origin node "d" and the relaying node "f" is two (node "d"–node "c"–node "e"–node "f"/ node "d"–node "c"–node "f") which are indicated by a bold line, and the number of second paths between the relaying node "f" and the destination node GW is three (node "f"–node "b"–node "g"–node GW/node "f"–node "b"–node "a"–node GW/node "f"–node "a"–node GW) which are indicated by a bold line. Accordingly, the total number of the paths between the transmission origin node "d" and the destination node GW via the relaying node "f" is (the number of first paths*the number of second paths). Therefore, the total number of the paths between the transmission origin node "d" and the destination node GW which relays the relaying node "f" is a multiplication value with the number of the first paths "two" between the origin node "d" and the relaying node "f" and the number of the second paths "three" between the relaying node "f" and the destination node GW (=2*3). And the multiplication value is subtracted from the total number of the paths "9" between the transmission origin node "d" and the destination node GW. In this way, the number of the alternative paths of the relaying node "f" from the transmission origin node "d" to the destination node GW, when the relaying node "f" is not used, is calculated as three (=9−2*3).

In addition, in this example, the number of the alternative paths of the node "f" is calculated, but the number of the alternative paths is calculated in other relaying nodes equally. In addition, the number of the alternative paths of the same relaying node varies according to the transmission origin node and the destination node of the data packet. Next, the calculation process of the number of the alternative paths will be described based on a specific example.

[Calculation Processing (S13) of the Number of the Alternative Paths]

Figure 13:
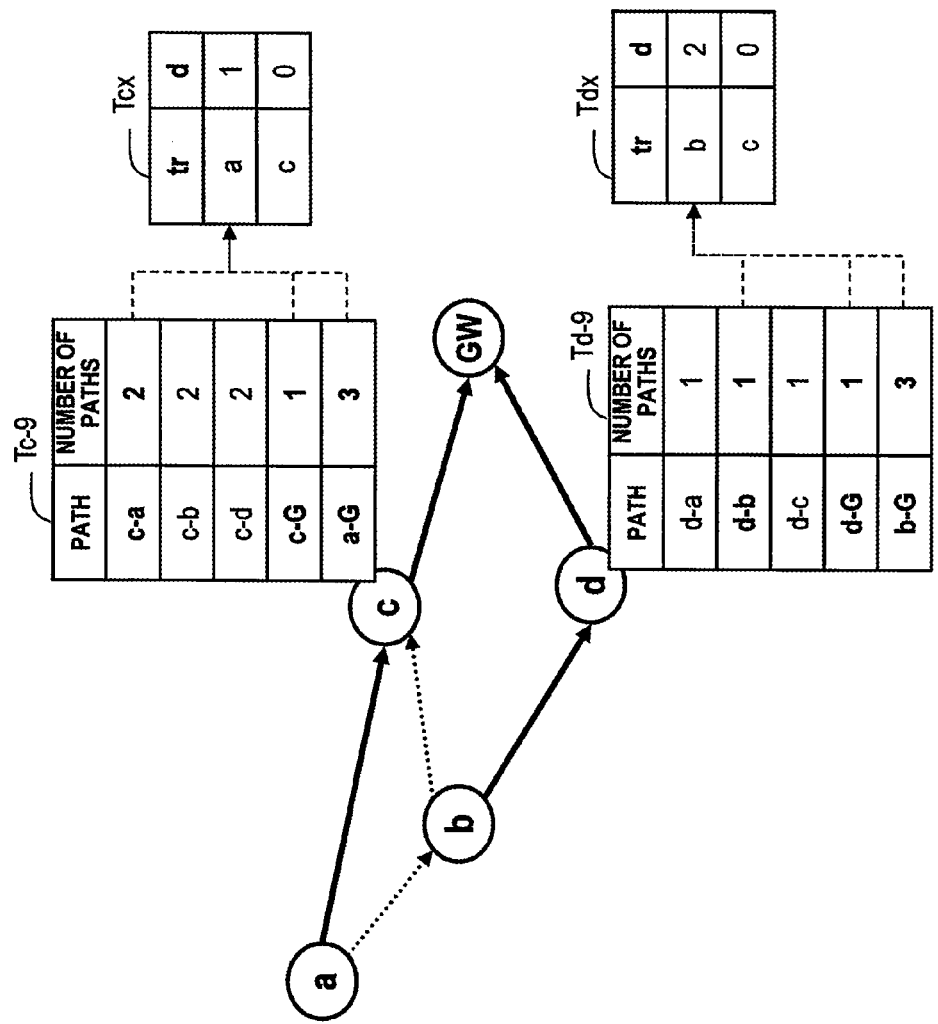
FIG. 13 is a diagram explaining the number of the alternative paths in the specific example of FIG. 5A-FIG. 9.

FIG. 13 is a diagram explaining the number of the alternative paths in the specific example of FIG. 5A-FIG. 9. FIG. 13 illustrates a number of the paths tables Tc-9 and Td-9 and a number of the alternative paths tables Tcx and Tdx of the node "c" and the node "d". The number of the alternative paths tables Tcx and Tdx have the transmission origin node "tr" of the data packet and the number of the alternative paths "d", as depicted by FIG. 13. In the example of FIG. 13, the destination node of each data packet is the node GW.

At first, the number (d) of the alternative path of the relaying node c in paths from the transmission origin node a (tr) to the destination node GW will be described. In this case, the number (d) of the alternative paths of the node "c" is calculated as 1 (=3−2*1), based on the calculating formula "of (total number of the paths (=3) between the transmission origin node "a" and the destination node GW)−(the number of the paths (=2) between the node "c" and the transmission origin node "a")*(the number of the paths (=1) between the node "c" and the destination node GW)". In this case, the alternative path is a path of (the node "a"→the node "b"→the node "d"→the node GW). In addition, the number of the alternative paths (d) of the node "c" in the path from the transmission origin node c (tr) to the destination node GW is "0" because the node "c" is a transmission origin node.

Similarly, the number of the alternative paths (d) of the relaying node "d" in the path from the transmission origin node b (tr) to the destination node GW will be described. In this case, the number (d) of the alternative paths of the node "d" is calculated as 2 (=3−1*1), based on the calculating formula "(total number of the paths (=3) between the transmission origin node "b" and the destination node GW)−(the number of the paths (=1) between the node "b" and the transmission origin node "d")*(the number of the paths (=1) between the node "d" and the destination node GW)". In addition, in this case, the alternative path is a path of (the node "b"→the node "c"→the node GW and the node "b"→the node "a"→the node "c"→the node GW).

As described above, according to the present embodiment, the calculation of the number of the alternative paths of the relaying node is easily performed based on the total number of the paths between the transmission origin node and the destination node, the number of the paths between the relaying node and the transmission origin node, and the number of the paths between the relaying node and the destination node. In addition, it is possible to effectively automatically generate the number of the paths based on the HELLO packet that is an existing control packet. In this way, it is possible that the node effectively quickly calculate the number of the alternative paths at the relay time of the node without taking the load to the network.

In addition, as described above in FIG. 9, a detected path may be limited based on the number of the hops of the path, for example. Therefore, a non-efficiency path is excluded, and the error of the calculated number of the alternative paths is evaded. When the total number of the paths from the transmission origin node to the destination node includes the number of the paths which is non-efficiency and the number of the relaying paths of the node does not include the number of non-efficiency path, for example, the number of the calculated number of the alternative paths includes an error. Therefore, for example, the paths are limited within long paths for a predetermined number of hops from the shortest number of the paths, in order to improve the precision of the number of the alternative paths.

In this way, for example, the path information in the present embodiment has a path within a standard distance range (for example, within 2 hops) from the shortest distance in the same path. And the node calculates the number of the alternative paths, based on the total number of the paths from the transmission origin node to the destination node and a number of the paths to relay the node based on the path information concerned. Thereby, the path that is non-efficiency is excluded from the total number path from the transmission origin node to the destination node and the number of the paths to relay the node, and the number of the highly precise alternative paths is calculated.

Next, a flow of the detailed process of each node will be described based on a flow chart in detail.

[A Flow Chart: The Overall Processing in the Node]

Figure 14:
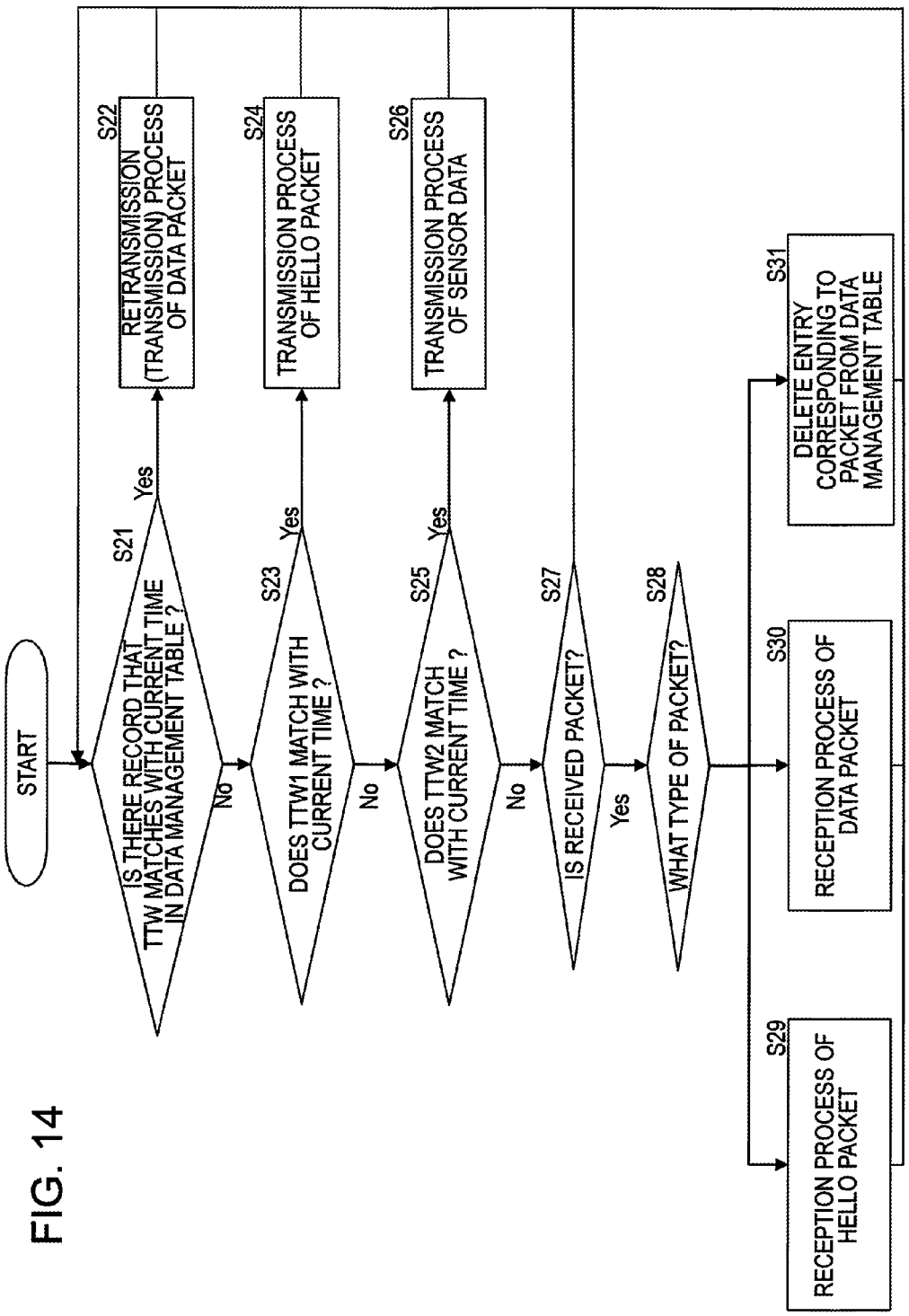
FIG. 14 is a flow chart diagram explaining the overall processing in the node.

FIG. 14 is a flow chart diagram explaining the overall processing in the node. In addition, the node corresponds to the transmission origin node and the relaying node.

Firstly, the node judges whether the record that a time TTW matches the current time exists in a data management table (S21). The data management table is a table for managing the packet data. After the transmission of the data packet, the node registers an entry corresponding to the data packet concerned with the data management table. And the node deletes the entry of the corresponding data packet from the data management table when the node received the ACK (acknowledge) corresponding to the transmission of the data packet from the transmission destination node.

The TTW is the time which is set corresponding to the data packet in the data management table and is set at the time after the ACK waiting time passes from the transmission time of the data packet. When the record that the time TTW matches with the current time exists in the data management table (YES of S21), it indicates that the ACK does not come back, even if the ACK waiting time passes after the transmission of the data packet. In other words, it means that the data packet that is transmitted is not received. Therefore, the node performs retransmission processing of the data packet (S22). The transmission processing of the data packet will be described later based on another flow chart.

On the other hand, when the record that the time TTW matches with the current time does not exist in the data management table (NO of S21), the node judges whether the time TTW1 matches with the current time (S23). The TTW1 is the time which is set after the transmission of the HELLO packet and indicates the time after the transmission period of the HELLO packet passes. The HELLO packet is broadcasted periodically. In other words, the time TTW1 indicates the transmission time of the next HELLO packet. Therefore, when the time TTW1 matches with the current time (YES of S23), it mean that the time is the transmission time of the HELLO packet. By this, the node performs the transmission processing of the HELLO packet (S24). The node in the present embodiment transmits the HELLO packet having the path information and the number of the paths. The transmission processing of the HELLO packet will be described later based on a different flow chart.

When the TTW1 does not match with the current time (NO of S23), the node judges whether the time TTW2 matches with the current time (S25). The time TTW2 is a time which is set after the transmission of the data packet and indicates the time after the transmission period of the data packet passes. In this example, the data packet is sent periodically. In other words, the time TTW2 indicates the transmission time of the data packet. Therefore, when the time TTW2 matches with the current time (YES of S25), it mean that it is the transmission time of the data packet. The node in this way performs the transmission processing of the data packet (S26). The node in the present embodiment sends the data packet having the total number of the paths of the path between the own node that is the transmission origin node and the destination node.

On the other hand, when the TTW2 does not match with the current time (NO of S25), the node judges whether the packet is received (S27). The node judges the type of the packet (S28) when the node received the packet (YES of S27). When the node does not receive the packet (NO of S27), the node returns to judgment processing of the step S21.

When the node receives the packet (YES of S27) and judges that the type of the received packet is the HELLO packet, the node performs the receiving process of the HELLO packet (S29). On the other hand, when the type of the received packet is the data packet, the node performs the receiving process of the data packet (S30). The receiving process of the HELLO packet (S29) and the receiving process of the data packet (S30) will be descried later based on a different flow chart. In addition, when the received packet is the ACK (S31), the node deletes the entry of the data packet corresponding to the ACK from the data management table. Reception confirmation of the data packet that has been sent is in this way carried out.

Next, the transmission processing of data packet (S22 of FIG. 14), the transmission processing of the HELLO packet (S24 of FIG. 14), the receiving processing of data packet (S29 of FIG. 14) and the receiving processing of the HELLO packet (S30 of FIG. 14) will be described based on each of flow charts sequentially.

[Transmission Processing of Data Packet (S22 in FIG. 14)]

Figure 15:
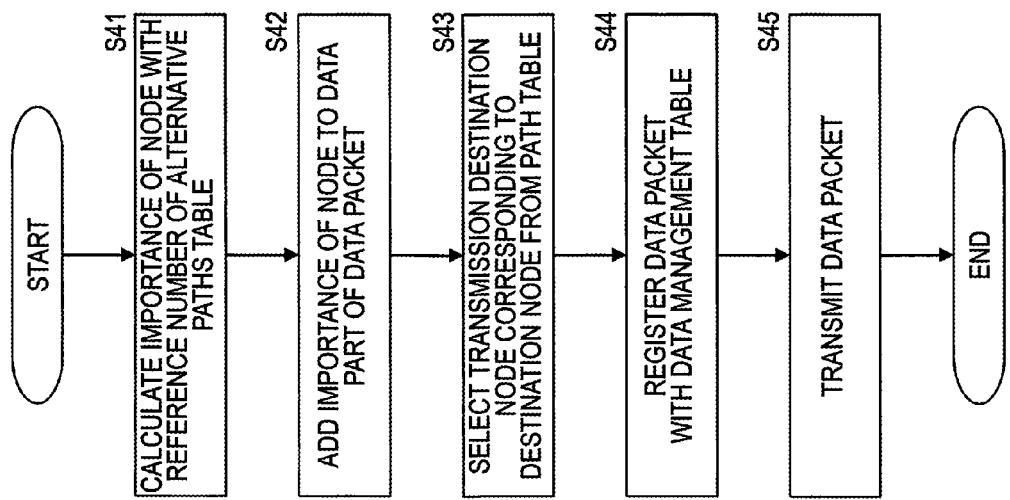
FIG. 15 is a flow chart diagram illustrating the transmission process of the data packet in the node.

FIG. 15 is a flow chart diagram illustrating the transmission process of the data packet in the node. The flow chart in FIG. 15 supports the processing of the process S22 in the flow chart of FIG. 14.

The node importance degree evaluation unit 61 in the node firstly calculates the importance of the own node with reference to the number of the alternative paths table Tx (S41). Especially, the node importance degree evaluation unit 61 calculates importance degree based on the number of the alternative paths of the own node. For example, when there are many the alternative paths numbers, the importance degree indicating a priority being low is calculated, while the importance degree indicating a priority being high is calculated when there are few number of the alternative paths. However, it is not limited to this example, the node importance degree evaluation unit 61 may calculate the importance degree based on the number of the paths to go by way of the own node or transferred data quantity, in addition to the number of the alternative paths.

Next, the data packet generation unit 41 and the number of the paths information addition unit 42 in the node adds the importance which is calculated in the process S41 to a data part of the data packet, in addition to the sensor data which are appointed data (S42). Or the number of the alternative paths may be added to the data part in substitution for the importance. And the data packet generation unit 41 selects the information of the next transmission destination node, in which the link node in the path to the destination node points, with reference to the path table (S43). In addition, the data packet transmission unit 43 in the node registers information of the data packet to transmit with the data management table (S44), then sends the data packet (S45).

[Transmission Process of HELLO Packet (S24 of FIG. 14)]

Figure 16:
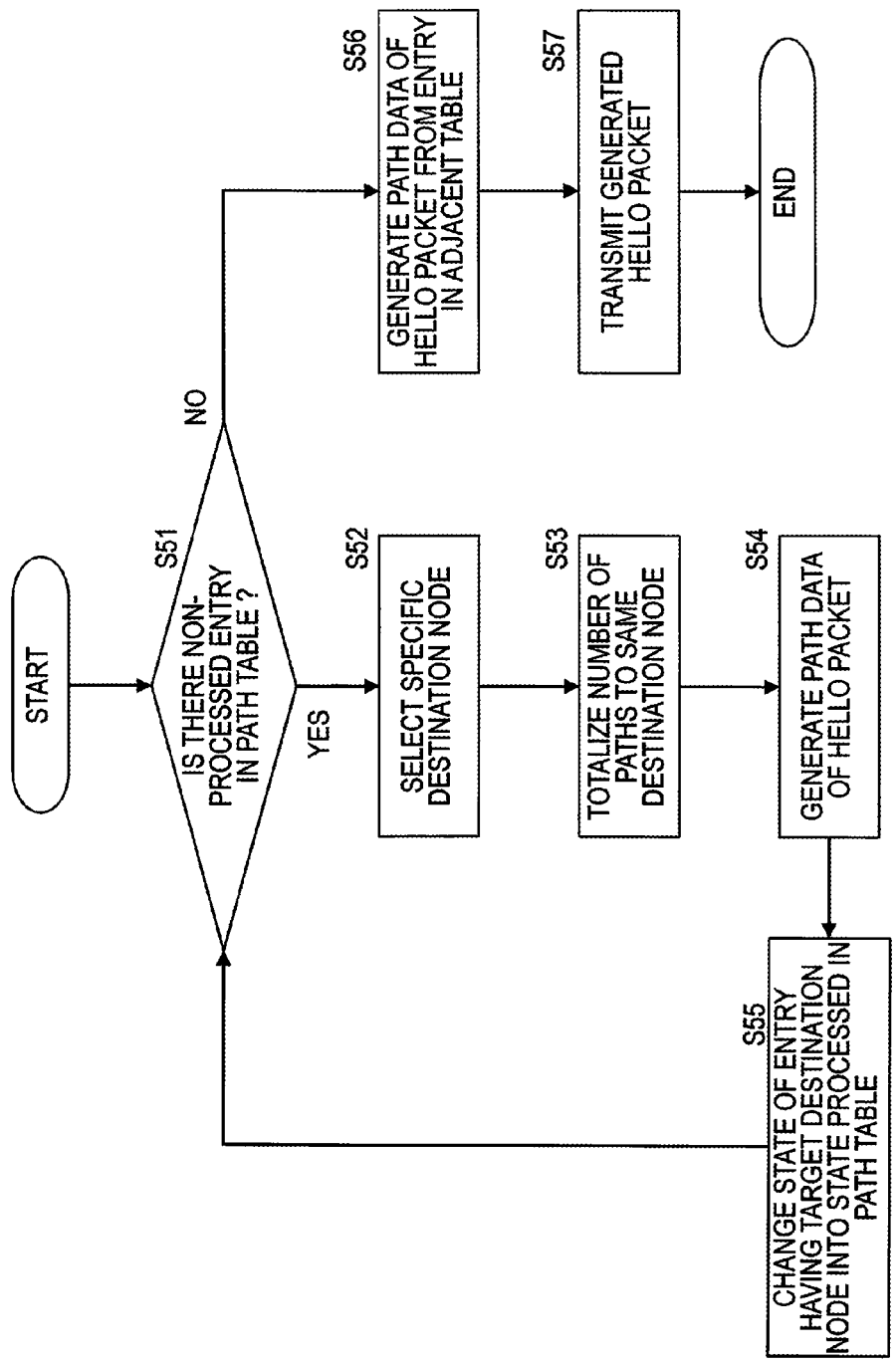
FIG. 16 is a flow chart diagram indicating the transmission processing of the HELLO packet in the node.

FIG. 16 is a flow chart diagram indicating the transmission processing of the HELLO packet in the node. The flow chart of FIG. 16 supports processing of the process S24 in the flow chart of FIG. 14.

The HELLO packet generation unit 34 in the node judges whether an entry of non-processing exists with reference to the path table (S51). When there is an entry of non-processing (YES of S51), the HELLO packet generation unit 34 selects a specific destination node among entries of non-processing in the path table (S52). Then the HELLO packet generation unit 34 adds up the number of the paths of the destination node which is selected (S53). Especially, the HELLO packet generation unit 34 extracts the number of paths of same destination nodes from the path table and calculates a total number of the paths.

Then the HELLO packet generation unit 34 creates path data which is added to the HELLO packet (S54). Especially, the HELLO packet generation unit 34 adds the path information and the number of the paths of the destination node which is selected to the HELLO packet. In addition, the HELLO packet generation unit 34 updates the entry of the destination node which is selected to the status which was already processed in the path table (S55).

When an entry of non-processing does not exist on the path table (NO of S51), the HELLO packet generation unit 34 generates the path data of the HELLO packet from the entry of the adjacent table with reference to the adjacent table (S56). Especially, the HELLO packet generation unit 34 acquires the information of the adjacent node with reference to the adjacent table, and sets it in the HELLO packet. And the HELLO packet transmission unit 33 in the node transmits the HELLO packet which is generated (S57).

[Receiving Process of HELLO Packet (S29) of FIG. 14]

Figure 17:
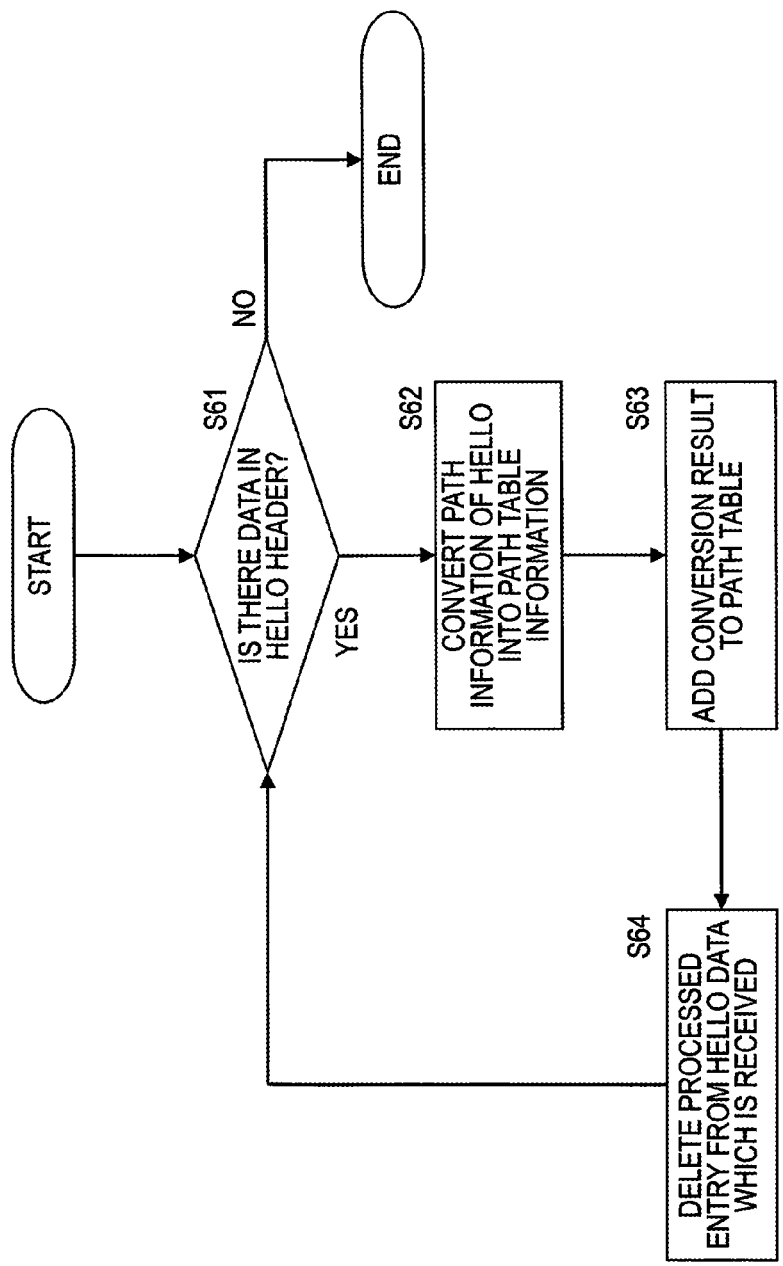
FIG. 17 is a flow chart diagram indicating the receiving processing of the HELLO packet in the node.

FIG. 17 is a flow chart diagram indicating the receiving processing of the HELLO packet in the node. The flow chart of FIG. 17 supports the processing of process S29 in the flow chart of FIG. 14.

When the HELLO packet reception unit 31 in the node receives the HELLO packet, the HELLO packet reception unit 31 determines whether the HELLO packet has data (S61). When the HELLO packet has data (YES of S61), the path information extraction unit 32 in the node converts the path information which is the data of which the HELLO packet has into the path table information (S62). Especially, the path information extraction unit 32 in the node rewrites the link node in the path information that the HELLO packet has, for example, in the origin of transmission node of the HELLO packet and counts up the number of the hops. In addition, the path information extraction unit 32, when the path information in which the HELLO packet includes has a plurality of same path of which the destination node and the link node are same, sets the total of the number of the paths of each path to a number of the paths. And the path information extraction unit 32 in the node adds the path information which is converted to the path table Tt (S63).

Then the path information extraction unit 32 in the node deletes the entry which has been converted into the path table information from the data in which the HELLO packet has. And the path information extraction unit 32 in the node performs conversion processing (S62) to the path table information of the path information and addition processing (S63) until an entry of non-processing does not exist about the data which HELLO packet has. On the other hand, when the HELLO packet does not have data (NO of S61), in other words, at the time of the first transmission of the HELLO packet, the path information extraction unit 32 in the node finishes receiving processing of the HELLO packet.

[Receiving Process of the Data Packet (S30 in FIG. 14)]

Figure 18:
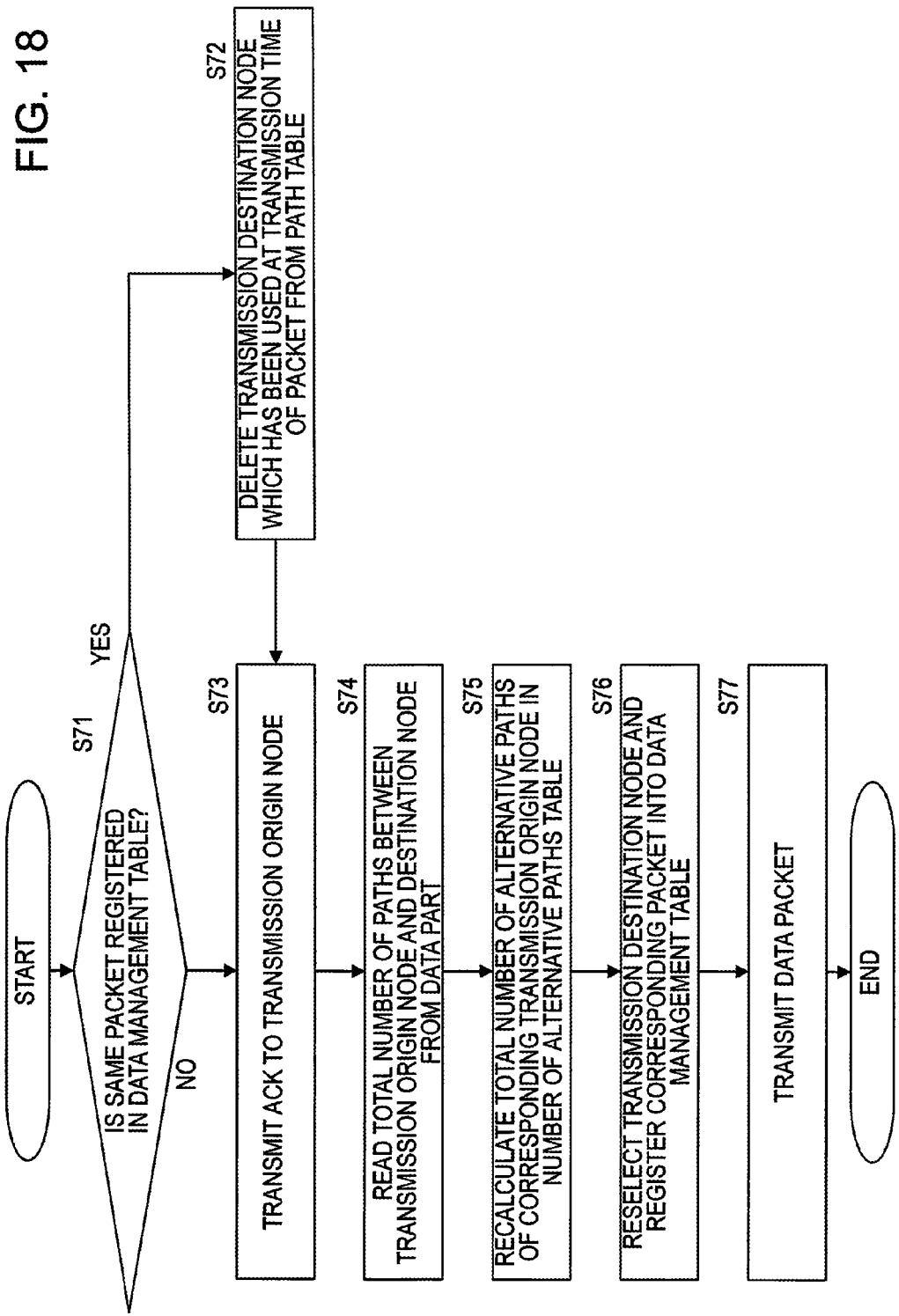
FIG. 18 is a flow chart diagram indicating the receiving processing of the data packet in the node.

FIG. 18 is a flow chart diagram indicating the receiving processing of the data packet in the node. The flow chart of FIG. 18 supports the processing of process S30 in the flow chart of FIG. 14.

When the data packet reception unit 44 in the node received the data packet, the data packet reception unit 44 judges whether the entry corresponding to the packet which is received is registered with the data management table (S71). When the entry corresponding to the data packet which is received is registered with the data management table (YES of S71), the number of the paths information extraction unit 45 in the node deletes the information of the transmission destination node corresponding to the entry from the path table Tt (S72). Then the data packet reception unit 44 sends the ACK indicating the reception of the data packet to the transmission origin node of the data packet, regardless of whether the entry corresponding to the packet which is received was registered with the data management table (S73).

Next, the number of the alternative paths calculation unit 51 in the node reads the total number of the paths between the transmission origin node and the destination node from the data part in the data packet (S74). The total number of the paths between the transmission origin node and the destination node is added to the data packet by the transmission origin node. Then the number of the alternative paths calculation unit 51 calculates the number of the alternative paths of the own node which is a relaying node (S75). Especially, the number of the alternative paths calculation unit 51 calculates the number of the alternative paths by subtracting a value, which is multiplied the number of the paths between the own node and the transmission origin node with the number of the paths between the own node and the destination node, from the total number of the paths between the transmission origin node and the destination node.

Then the number of the alternative paths calculation unit 51 registers the number of the alternative paths which is calculated with the number of the alternative paths table Tx. Especially, the number of the alternative paths calculation unit 51 stores the number of the alternative paths which is calculated, associated with the transmission origin node, in the number of the alternative paths table Tx. Then the data packet transmission unit 43 in the node selects next transmission destination node of the data packet with reference to the path table Tt and registers the information of the data packet with the data management table (S76). And the data packet transmission unit 43 sends the data packet which is generated (S77).

Next, the extraction processing of the importance in the destination node will be described.

[Extraction Processing of Importance]

Figure 19:
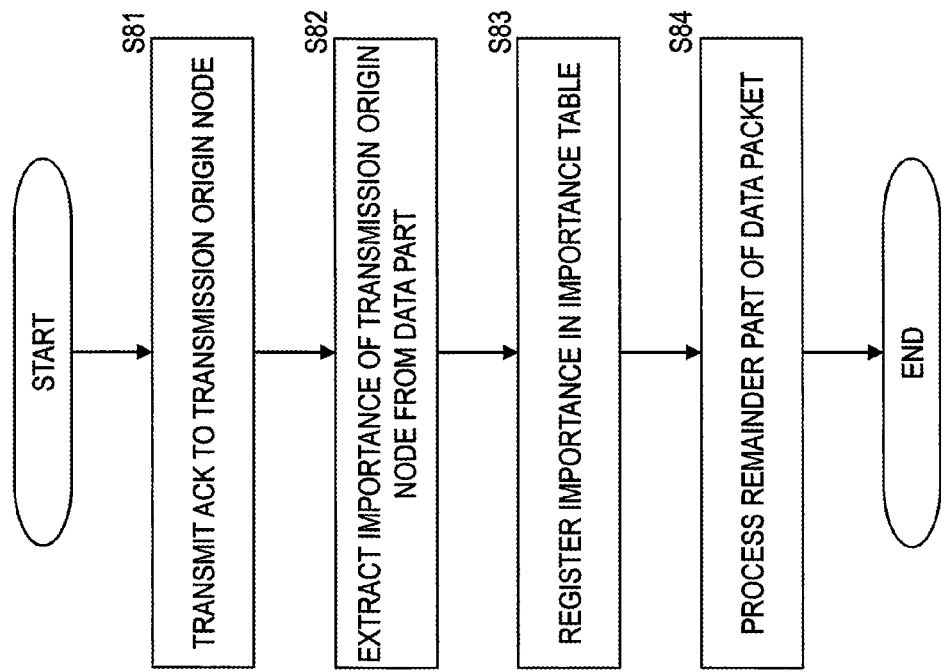
FIG. 19 is a flow chart diagram indicating the extraction processing of the importance in the destination node.

FIG. 19 is a flow chart diagram indicating the extraction processing of the importance in the destination node. In the present embodiment, the importance calculated in the transmission origin node is transmitted to the destination node with the data such as sensor data.

When the destination node receives the data packet, the destination node transmits the ACK to the transmission origin node of the data packet (S81). Then the destination node extracts the importance of the transmission origin node, which is added by the transmission origin node, from the data part in the data packet (S82). Then the destination node registers the extracted importance in an importance table so that the transmission origin node is distinguishable (S83). And the destination node processes remaining data of the data packet (S84). For example, the destination node performs the processing of the sensor data in the data part of the data packet.

And the user judges a priority of the maintenance of a wireless terminal devices (nodes) based on the extracted importance in the destination node. Or when the number of the alternative paths is added to the data packet, the user may judge the priority of the maintenance about the wireless terminal devices based on the number of the alternative paths. Thereby it is possible to maintain a large number of wireless terminal devices based on the priority of the maintenance of the wireless terminal device effectively even if it is little staff.

As described above, the wireless terminal device (node) according to the present embodiment has a receiver which receives a first packet including path information and a first number of paths of each path, which is sent from another wireless terminal device (node) which connects to an own wireless terminal device (own node) mutually, and a second packet including a second number of paths between a transmission origin wireless terminal device (a transmission origin node) and a destination wireless terminal device (a destination node), which is sent from the transmission origin wireless terminal device (a transmission origin node) and a calculation unit which multiplies with the first number of the paths between the own wireless terminal device (own node) and the transmission origin wireless terminal device (transmission origin node) and another first number of paths between the own wireless terminal device (own node) and the destination wireless terminal device (destination node) and calculates a number of alternative paths of the own wireless terminal device (own node) by subtracting the multiplied value from the second number of the paths which is received. In addition, in the present embodiment, the first number of the paths is the total number of the paths from the own wireless terminal device to the destination wireless terminal device (transmission origin node, destination node) through another wireless terminal device which is adjacent with the own wireless terminal device.

It is possible that the node according to the present embodiment easily calculates the number of the paths in each node by transmitting and receiving an existing control packet (HELLO packet). Thereby, it is possible that the node according to the present embodiment easily and effectively calculates the number of the alternative paths based on the number of the paths of own node which is acquired based on the existing control packet and the total number of the paths from the transmission origin node to the destination node in which the data packet has.

In addition, it is possible that the node according to the present embodiment acquires the number of the paths of each path by slightly increasing the data size of the existing control packet for the field storing the number of the paths without increasing the classification of the control packet and number of packets. In addition, it is possible that the node acquires the total number of the paths between the transmission origin node and the destination node by slightly increasing data size of the existing data packet. Thereby, it is possible that the node according to the present embodiment easily calculates the number of the alternative paths using an existing resource without increasing the load of the network. And the latest number of the paths is always maintained in the node by reducing the load of the network. In this way, it is possible that the node calculates a highly precise number of the alternative paths based on the number of latest path effectively.

In contrast, based on a general method, for example, the adjacent table of each node is transmitted to a collection node, and the number of the paths is calculated based on the adjacent table of each node in the collection node. For example, the collection node builds the path information based on the adjacent table of all nodes, and calculates the number of the alternative paths based on the path information. Therefore, the processing load in the collection node becomes higher, and the path construction processing in the collection node is redundant with the path construction processing in each node. In addition, because of transmitting the adjacent table to the collection node regularly, the number of packets increases and the load of the network increases. In addition, when performing the confirmation of the transmission of the adjacent table, the control packets such as ACK for transmission confirmation are necessary, thereby the number of control packets increases more. Therefore, a network becomes the high load state, and the transmission to the collection node of the adjacent table may take time. Therefore, the collection node may not calculate the number of the alternative paths based on the latest adjacent table.

Especially, according to the general method, the data quantity of adjacent table transmission processing is calculated according to a calculating formula of "the number of all nodes*the average size of adjacent table*path average length*table data collection frequency" when assuming that adjacent table is collected regularly. In addition, the adjacent table increases the size according to increase of the number of the nodes because the adjacent table has the information with all adjacent nodes. In addition, the quantity of data of adjacent table transmission processing increase the quantity of data for ACK, that is, "the number of all nodes*ACK packet size*path average length" when control packets such as ACK is needed.

In contrast, it is possible that the node according to the present embodiment calculates the number of each path by adding the information of the number of the paths to an existing control packet without needing the transmission and reception of the adjacent table. For example, in the present embodiment, the quantity of increasing data is calculated according to a calculating formula of "number of all node*1 byte (size of the numerical value field storing the number of the paths)*transmission frequency of the HELLO packet". In addition, the quantity of increase data of the number of the paths (the second number of the paths), which is transmitted to a relaying node when relaying the data packet, is calculated according to calculating formula of "number of all nodes*1 byte (size of the numerical value field storing the total number of the paths)*(path average length−1)*sensor data collection frequency".

In this way, according to the present embodiment, it is not necessary to prepare for a control packet newly, and there are few increments of the data quantity for the calculation of the number of the paths and the calculation of the number of the alternative paths. In other words, in the present embodiment, there is a little quantity of data increasing for the calculation of the number of the alternative paths. Therefore, it is possible that the node calculates the number of the alternative paths highly precise effectively, based on the updated first number of the paths and updated second number of the paths with the latest state, because the load does not depend on the network. Thereby, it is possible to perform maintenance by little staff highly precise, because of becoming able to calculate the importance of the node effectively.

In addition, the wireless terminal device according to the present embodiment has a second packet transmission unit which adds both or either one of calculated number of the alternative paths and the importance indicating the priority of the maintenance based on the number of the alternative paths and sends it based on the path information in addition to the number of second path, when an own wireless terminal device (own node) is the wireless terminal device of the transmission origin (transmission origin node).

In this way, it is possible that the node according to the present embodiment adds the number of the alternative paths or importance which is calculated based on the number of the alternative paths to the data packet including data value such as sensor data and sends it. In this way, using an existing packet, it is possible to collect the number of the alternative paths or importance. Therefore, it is possible that the load to the network is held down and to collect the number of the alternative paths or importance quickly and effectively.

In addition, in the wireless terminal device according to the present embodiment, importance is the first importance at the time when the number of the alternative paths is first value, and the importance is the second importance indicating a priority being higher than the first importance at the time when the number of the alternative paths is second value that is smaller than the first value. Thereby, when there is little number of the alternative paths of wireless terminal devices, importance of the maintenance becomes higher, and the importance of the maintenance becomes lowers when there are many number of the alternative paths. Therefore, it is possible to perform the maintenance of the wireless terminal device effectively.

In addition, in the present embodiment, the path information has the path within the standard distance range from the shortest distance in the same path, and the number of the alternative paths calculation unit calculates the number of the alternative paths based on the first number of the paths and the second number of the paths based on the paths within the standard distance range. In other words, the path is limited within path range which is long for a predetermined number of hops (for example, 2 hops) from the shortest number of the paths in the same paths. Thereby, the path that is non-efficiency is excluded, and the error of the calculated number of the alternative paths is evaded.

In addition, in the present embodiment, a priority of the maintenance about a wireless terminal device is judged based on both or either one of the number of the alternative paths and the importance indicating the priority of maintenance based on the number of the alternative paths. By judging a priority of the maintenance of a wireless terminal device based the number of the alternative paths or importance, it is possible that the user realizes the maintenance of wireless terminal device more effective by few staff.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless terminal device included in a wireless communication system in which each of a plurality of wireless terminal devices relays a packet to a destination wireless terminal device, the wireless terminal device comprising:

a transmitter configured to repeat a relay operation including,
when the wireless terminal device operates as a first wireless terminal HELLO packet relay device that receives a first HELLO packet and that transmits a second HELLO packet, which is generated in response to receiving of the first HELLO packet, to adjacent wireless terminal devices,
receiving a first HELLO packet including path information between a first adjacent wireless terminal device and a second wireless terminal device and a number that indicates the quantity of paths between the first adjacent wireless terminal device and the second wireless terminal device from the first adjacent wireless terminal device, and
transmitting a second HELLO packet, generated in response to receiving of the first HELLO packet, that includes path information between the first wireless terminal HELLO packet relay device and a third wireless terminal device and the number that indicates the quantity of paths between the first wireless terminal HELLO packet relay device and the third wireless terminal device,
wherein each of the plurality of wireless terminal devices also includes a transmitter configured to repeat the relay operation;

a path information memory configured to store the path information and the number that indicates the quantity of paths included in the second HELLO packet which is generated in response to receiving of the first HELLO packet received from adjacent wireless terminal devices; and a processor, in response to receiving a data packet, sent from a transmission origin wireless terminal device, that includes a number that indicates the quantity of paths between the transmission origin wireless terminal device and a destination wireless terminal device, configured to,
multiply a number that indicates the quantity of paths between an own wireless terminal device and the transmission origin wireless terminal device stored in the path information memory with a number that indicates the quantity of paths between the own wireless terminal device and the destination wireless terminal device stored in the path information memory and
calculate a number that indicate the quantity of alternative paths of the own wireless terminal device by subtracting the multiplied value from the number of the paths between the transmission origin wireless terminal device and the destination wireless terminal device, included in the data packet that is sent from the transmission origin wireless terminal device.

2. The wireless terminal device according to claim 1, wherein the transmitter is configured to add both or either one of the calculated number that indicates the quantity of the alternative paths and importance indicating a priority of a maintenance based on the calculated number that indicates the quantity of the alternative paths to the data packet, and send the data packet based on the path information, when the wireless terminal device is a wireless terminal device of the transmission origin.

3. The wireless terminal device according to claim 2, wherein the importance is a first importance when the number that indicates the quantity of the alternative paths is a first value, and the importance is a second importance indicating a priority being higher than the first importance when the number that indicates the quantity of the alternative paths is second value that is smaller than the first value.

4. The wireless terminal device according to claim 1, wherein the path information has the path within a standard distance range from a shortest distance in a same path, and wherein
the processor in configured to calculate the number that indicates the quantity of the alternative paths based on a number that indicates the quantity of paths within the standard distance range.

5. The wireless terminal device according to claim 1, wherein a path information memory configured to store both or either one of the number that indicates the quantity of the alternative paths and the importance indicating the priority of maintenance based on the number that indicates the quantity of the alternative paths for judging a priority of the maintenance of the wireless terminal device.

6. A method for generating a number of alternative paths of a wireless terminal device included in a wireless communication system in which each of a plurality of wireless terminal devices relays a packet to a destination wireless terminal device, the method comprising:
when the wireless terminal device operates as a first wireless terminal HELLO packet relay device that receives a first HELLO packet and that transmits a second HELLO packet, which is generated in response to receiving of the first HELLO packet, to adjacent wireless terminal devices,
receiving, by a transmitter, a first HELLO packet including path information between first adjacent wireless terminal device and a second wireless terminal device and a number that indicates the quantity of paths between the first adjacent wireless terminal device and the second wireless terminal device from the first adjacent wireless terminal device, and
transmitting, by the transmitter, a second HELLO packet, generated in response to receiving of the first HELLO packet, that includes path information between the first wireless terminal HELLO packet relay device and a third wireless terminal device and the number that indicates the quantity of paths between the first wireless terminal HELLO packet relay device and the third wireless terminal device,
wherein each of the plurality of wireless terminal devices also includes the transmitter;
storing, by a path information memory, the path information and the number that indicates the quantity of paths included in the second HELLO packet which is generated in response to receiving of the first HELLO packet received from adjacent wireless terminal devices; and
in response to receiving a data packet, sent from a transmission origin wireless terminal device, that includes a number that indicates the quantity of paths between the transmission origin wireless terminal device and a destination wireless terminal device,
multiply, by a processor, a number that indicates the quantity of paths between an own wireless terminal device and the transmission origin wireless terminal device stored in the path information memory with a number that indicates the quantity of paths between the own wireless terminal device and the destination wireless terminal device stored in the path information memory and
calculate, by the processor, a number that indicate the quantity of alternative paths of the own wireless terminal device by subtracting the multiplied value from the number of the paths between the transmission origin wireless terminal device and the destination wireless terminal device, included in the data packet that is sent from the transmission origin wireless terminal device.

7. A wireless communication system in which each of a plurality of wireless terminal devices relays a packet to a destination wireless terminal device, the wireless communication system comprising:
a first wireless terminal device including
a transmitter configured to repeat a relay operation including,
when the first wireless terminal device operates as a HELLO packet relay device that receives a first HELLO packet and that transmits a second HELLO packet, which is generated in response to receiving of the first HELLO packet, to adjacent wireless terminal devices,
receiving a first HELLO packet including path information between first adjacent wireless terminal device and a second wireless terminal device and a number that indicates the quantity of paths between the first adjacent wireless terminal device and the second wireless terminal device from the first adjacent wireless terminal device, and
transmitting a second HELLO packet, generated in response to receiving of the first HELLO packet, that includes path information between the first wireless terminal HELLO packet relay device and a third wireless terminal device and the number that indicates the quantity of paths between the first wireless terminal HELLO packet relay device and the third wireless terminal device, wherein each of the plurality of wireless terminal devices also includes a transmitter configured to repeat the relay operation;

a path information memory configured to store the path information and the number that indicates the quantity of paths included in the second HELLO packet which is generated in response to receiving of the first HELLO packet received from adjacent wireless terminal devices; and a processor, in response to receiving a data packet, sent from a transmission origin wireless terminal device, that includes a number that indicates the quantity of paths between the transmission origin wireless terminal device and a destination wireless terminal device, configured to, multiply a number that indicates the quantity of paths between an own wireless terminal device and the transmission origin wireless terminal device stored in the path information memory with a number that indicates the quantity of paths between the own wireless terminal device and the destination wireless terminal device stored in the path information memory and calculate a number that indicate the quantity of alternative paths of the own wireless terminal device by subtracting the multiplied value from the number of the paths between the transmission origin wireless terminal device and the destination wireless terminal device, included in the data packet that is sent from the transmission origin wireless terminal device.

* * * * *